US012597192B2

(12) United States Patent
Watanabe

(10) Patent No.: US 12,597,192 B2
(45) Date of Patent: Apr. 7, 2026

(54) INFORMATION PROCESSING APPARATUS AND INFORMATION PROCESSING METHOD

(71) Applicant: SONY GROUP CORPORATION, Tokyo (JP)

(72) Inventor: Shinji Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 79 days.

(21) Appl. No.: 18/574,111

(22) PCT Filed: Mar. 9, 2022

(86) PCT No.: PCT/JP2022/010265
§ 371 (c)(1),
(2) Date: Dec. 26, 2023

(87) PCT Pub. No.: WO2023/276292
PCT Pub. Date: Jan. 5, 2023

(65) Prior Publication Data
US 2025/0069313 A1 Feb. 27, 2025

(30) Foreign Application Priority Data
Jul. 2, 2021 (JP) ................................. 2021-111016

(51) Int. Cl.
*G06T 13/80* (2011.01)
*G06T 7/246* (2017.01)
(52) U.S. Cl.
CPC .............. *G06T 13/80* (2013.01); *G06T 7/248* (2017.01)

(58) Field of Classification Search
None
See application file for complete search history.

(56) References Cited

U.S. PATENT DOCUMENTS

2019/0250806 A1* 8/2019 Matsuda ............ G06F 3/04842

FOREIGN PATENT DOCUMENTS

JP 2006-048465 A 2/2006
JP 2009-055152 A 3/2009
JP 2021-052370 A 4/2021

OTHER PUBLICATIONS

International Search Report and Written Opinion of PCT Application No. PCT/JP2022/010265, issued on May 31, 2022, 08 pages of ISRWO.

* cited by examiner

*Primary Examiner* — Peter Hoang
(74) *Attorney, Agent, or Firm* — CHIP LAW GROUP

(57) ABSTRACT

Provided is an information processing apparatus including an information acquisition unit that acquires information regarding a length of a moving image template and information regarding a length of a material moving image to be fitted into the moving image template and a change processing unit that changes reproduction management information regarding the moving image template in order to adjust the length of the moving image template in accordance with the length of the material moving image.

19 Claims, 21 Drawing Sheets

FIG. 6

| FRAME ID BEFORE CHANGE | FRAME ID AFTER CHANGE | COORDINATE INFORMATION BEFORE CHANGE | COORDINATE INFORMATION AFTER CHANGE | |
| --- | --- | --- | --- | --- |
| | | | Case1 | Case2 |
| 1 | 1 | (x, y) | (x, y) | (x, y) |
| 2 | 2 | (x+6, y) | (x+9, y) | (x+6, y) |
| 3 | | (x+12, y) | | |
| 4 | 3 | (x+18, y) | (x+18, y) | (x+12, y) |
| 5 | 4 | (x+24, y) | (x+27, y) | (x+18, y) |
| 6 | | (x+30, y) | | |
| 7 | 5 | (x+36, y) | (x+36, y) | (x+24, y) |
| 8 | 6 | (x+42, y) | (x+45, y) | (x+30, y) |
| 9 | | (x+48, y) | | |
| 10 | 7 | (x+54, y) | (x+54, y) | (x+36, y) |
| 11 | 8 | (x+60, y) | (x+63, y) | (x+42, y) |
| 12 | | (x+66, y) | | |
| 13 | 9 | (x+72, y) | (x+72, y) | (x+48, y) |
| 14 | 10 | (x+78, y) | (x+81, y) | (x+54, y) |
| 15 | | (x+84, y) | | |
| 16 | 11 | (x+90, y) | (x+90, y) | (x+60, y) |

FIG. 9

| FRAME ID BEFORE CHANGE | FRAME ID AFTER CHANGE | COORDINATE INFORMATION BEFORE CHANGE | COORDINATE INFORMATION AFTER INTERPOLATION |
|---|---|---|---|
| 1 | 1 | (x, y) | (x, y) |
| 2 | 2 | (x+6, y) | (x+4, y) |
|  | 3 |  | (x+8, y) |
| 3 | 4 | (x+12, y) | (x+12, y) |
| 4 | 5 | (x+18, y) | (x+16, y) |
|  | 6 |  | (x+20, y) |
| 5 | 7 | (x+24, y) | (x+24, y) |
| 6 | 8 | (x+30, y) | (x+28, y) |
|  | 9 |  | (x+32, y) |
| 7 | 10 | (x+36, y) | (x+36, y) |
| 8 | 11 | (x+42, y) | (x+40, y) |
|  | 12 |  | (x+44, y) |
| 9 | 13 | (x+48, y) | (x+48, y) |
| 10 | 14 | (x+54, y) | (x+52, y) |
|  | 15 |  | (x+56, y) |
| 11 | 16 | (x+60, y) | (x+60, y) |

FIG. 12

| FRAME ID BEFORE CHANGE | FRAME ID AFTER CHANGE | COORDINATE INFORMATION BEFORE CHANGE | COORDINATE INFORMATION AFTER EXTRAPOLATION |
|---|---|---|---|
| 1 | 1 | (x, y) | (x, y) |
| 2 | 2 | (x+6, y) | (x+6, y) |
| 3 | 3 | (x+12, y) | (x+12, y) |
| 4 | 4 | (x+18, y) | (x+18, y) |
| 5 | 5 | (x+24, y) | (x+24, y) |
| 6 | 6 | (x+30, y) | (x+30, y) |
| 7 | 7 | (x+36, y) | (x+36, y) |
| 8 | 8 | (x+42, y) | (x+42, y) |
| 9 | 9 | (x+48, y) | (x+48, y) |
| 10 | 10 | (x+54, y) | (x+54, y) |
| 11 | 11 | (x+60, y) | (x+60, y) |
|  | 12 |  | (x+66, y) |
|  | 13 |  | (x+72, y) |
|  | 14 |  | (x+78, y) |
|  | 15 |  | (x+84, y) |
|  | 16 |  | (x+90, y) |

FIG. 13

| FRAME ID BEFORE CHANGE | FRAME ID AFTER CHANGE | COORDINATE INFORMATION BEFORE CHANGE | COORDINATE INFORMATION AFTER CHANGE |
|---|---|---|---|
| 1 | 1 | (x, y) | (x, y) |
|  | 2 |  | (x+3, y) |
| 2 | 3 | (x+6, y) | (x+6, y) |
|  | 4 |  | (x+9, y) |
| 3 | 5 | (x+12, y) | (x+12, y) |
|  | 6 |  | (x+15, y) |
| 4 | 7 | (x+18, y) | (x+18, y) |
|  | 8 |  | (x+21, y) |
| 5 | 9 | (x+24, y) | (x+24, y) |
|  | 10 |  | (x+27, y) |
| 6 | 11 | (x+30, y) | (x+30, y) |
|  | 12 |  | (x+33, y) |
|  | 13 |  | (x+36, y) |
|  | 14 |  | (x+39, y) |

FIG. 17

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2022/010265 filed on Mar. 9, 2022, which claims priority benefit of Japanese Patent Application No. JP 2021-111016 filed in the Japan Patent Office on Jul. 2, 2021. Each of the above-referenced applications is hereby incorporated herein by reference in its entirety.

TECHNICAL FIELD

The present technology relates to a technical field of an information processing apparatus, an information processing method, and a program for adjusting a reproduction time length of a moving image template in accordance with a material moving image.

BACKGROUND ART

A technique using a moving image template for easily creating a desired moving image is known.

For example, Patent Document 1 below discloses a technique of arranging content as a material moving image according to layout information.

CITATION LIST

Patent Document

Patent Document 1: Japanese Patent Application No. 2006-048465

SUMMARY OF THE INVENTION

Problems to be Solved by the Invention

By the way, a reproduction time length of a prepared material moving image varies from one user to another. However, according to the method described in Patent Document 1, a time length of a moving image template cannot be adjusted according to a material moving image, there is a possibility that a moving image desired by a user is not generated.

The present technology has been made in view of such a problem, and an object thereof is to easily generate a moving image of any length by using a material moving image provided by a user.

Solutions to Problems

An information processing apparatus according to the present technology includes an information acquisition unit that acquires information regarding a length of a moving image template and information regarding a length of a material moving image to be fitted into the moving image template; and a change processing unit that changes reproduction management information regarding the moving image template in order to adjust the length of the moving image template in accordance with the length of the material moving image.

With this configuration, a reproduction time length of the moving image template is automatically adjusted in accordance with the length of the material moving image.

BRIEF DESCRIPTION OF DRAWINGS

FIG. 6 is a diagram illustrating an example of change of reproduction management information resulting from deletion of a frame.

FIG. 9 is a diagram illustrating an example of change of reproduction management information resulting from interpolation of a frame.

FIG. 12 is a diagram illustrating an example of change of reproduction management information resulting from extrapolation of a frame.

FIG. 13 is a diagram illustrating an example of change of reproduction management information in a case where both interpolation and extrapolation are used for addition of a frame.

FIG. 17 is a diagram for explaining frame addition in the transition layer.

MODE FOR CARRYING OUT THE INVENTION

Figure 1:
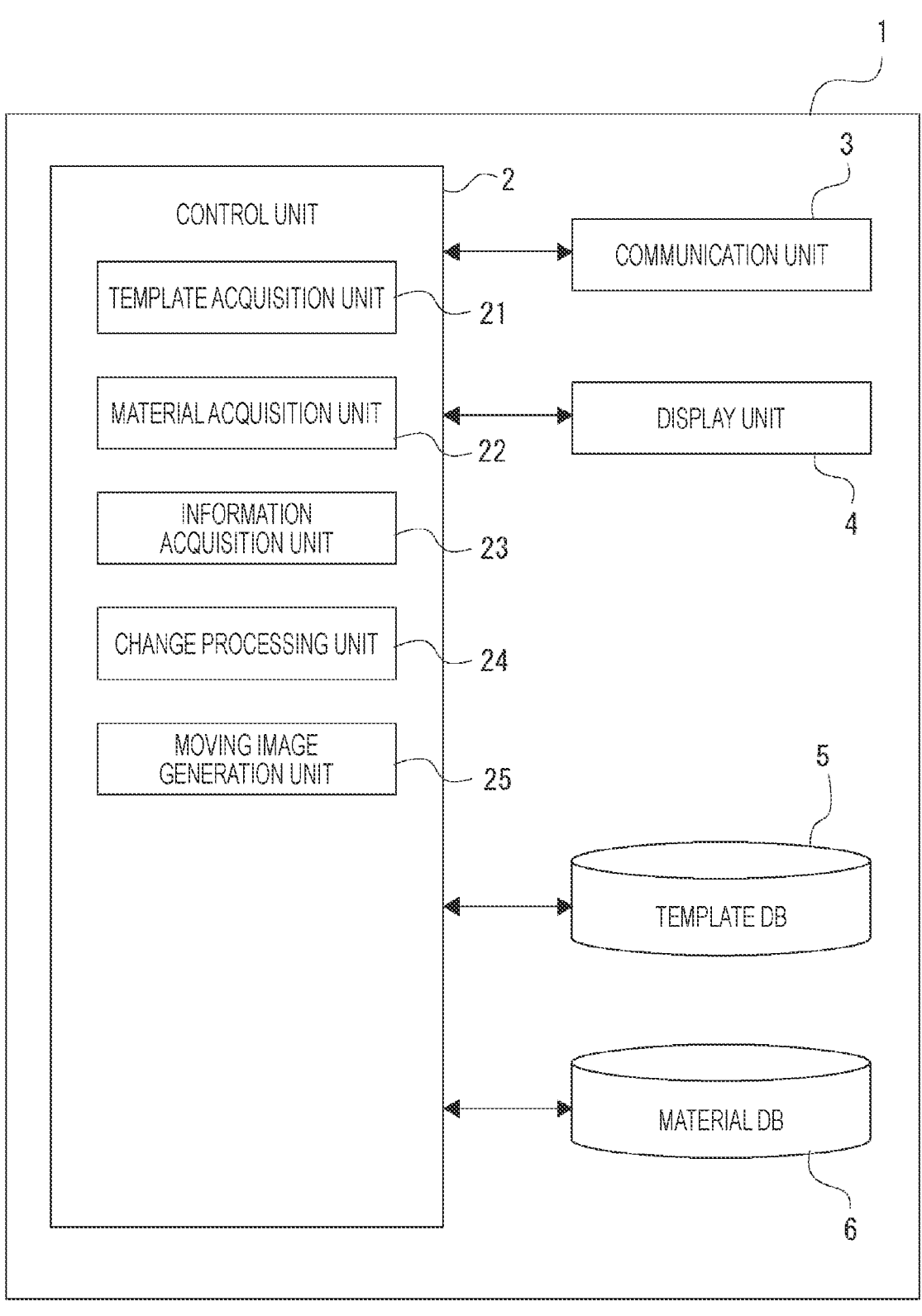
FIG. 1 is a diagram illustrating a configuration example of an information processing apparatus.

Hereinafter, embodiments of an information processing apparatus according to the present technology will be described in the following order with reference to the accompanying drawings.

<1. Configuration of information processing apparatus>
<2. Functional configuration>
<3. Configuration of moving image template>
<4. Adjustment of reproduction time length of moving image template>
<4-1. Deletion of frame>
<5. Transition layer>
<5-1. Deletion of frame of transition moving image>
<5-2. Addition of frame of transition moving image>
<6. Frame synthesis>
<7. User interface>
<8. Processing flow>
<9. Computer apparatus>
<10. Conclusion>
<11. Present technology>

1. Configuration of Information Processing Apparatus

A configuration example of an information processing apparatus 1 according to the present embodiment will be described with reference to FIG. 1.

The information processing apparatus 1 is a computer apparatus that combines material moving images provided by a user to generate desired moving image data, and includes a control unit 2, a communication unit 3, a display unit 4, a template database (DB) 5, and a material DB 6.

The control unit 2 realizes various functions in order for the information processing apparatus 1 to generate moving image data and provide the moving image data to a user.

The communication unit 3 performs data communication with another information processing apparatus or the like in order for the control unit 2 to realize a predetermined function. Specifically, the communication unit 3 performs, for example, communication processing for acquiring data such as a material moving image from another information processing apparatus.

The display unit 4 is a monitor device such as a liquid crystal display (liquid crystal display) device, an organic light emitting diode (OLED) device, or a cathode ray tube (CRT) display device that displays, for a user, a user interface (UI) for generating a moving image or a generated moving image.

The template DB 5 stores therein template data serving as a template for generating a moving image. In the following description, the template data is referred to as a "moving image template".

The moving image template includes a plurality of frames Fr constituting a moving image. Each frame Fr includes a material frame into which a material provided by a user is to be fitted as appropriate. Furthermore, a default still image may be additionally arranged at a predetermined position.

The moving image template provides an animation effect by arranging a default still image or a material provided by a user at a predetermined position in each frame and changing the predetermined position every frame.

The moving image template has meta information in units of frames Fr. In the following description, the meta information is referred to as "reproduction management information".

The reproduction management information is stored in the template DB 5 in association with the moving image template.

The reproduction management information includes a frame identification (ID) for specifying a frame Fr.

The reproduction management information includes, for example, coordinate information indicating a position at which a material moving image is to be fitted, and size information indicating a size of the material moving image. For example, a rectangular material frame MaF into which a material moving image is to be fitted is specified by the coordinate information and the size information. The coordinate information is, for example, upper left coordinates of the rectangular material frame MaF, and the size information includes information for determining a vertical size and information for determining a horizontal size.

Note that the shape of the material frame MaF is not limited to a rectangular shape, and may be a circular shape, an elliptical shape, a star shape, or the like.

The reproduction management information includes shape information for specifying the shape of the material frame MaF.

The reproduction management information includes coordinate information and size information about a crop frame CrF as a predetermined frame set at a predetermined position within the material frame MaF. The position and size of the crop frame CrF can be specified by the coordinate information and the size information.

Note that the reproduction management information may include shape information of the crop frame CrF.

The crop frame CrF is set to perform predetermined processing by using a partial moving image that is a partial area of the material moving image. For example, in a case where a specific region of a material moving image is enlarged as the material moving image is reproduced, a crop frame CrF is set for the enlarged region.

In addition, the crop frame CrF is set as appropriate in order to realize processing of moving or rotating a specific region, processing of attracting attention to a specific region, or the like.

The reproduction management information includes information indicating transparency DoC of the material moving image to be fitted into the material frame MaF. The transparency DoC is, for example, a numerical value such as 0 to 100 or 0 to 1, and the larger the numerical value, the more thinly the material moving image is displayed.

The reproduction management information includes a material type ToM indicating a type of material to be fitted into the material frame MaF. The material type ToM is, for example, information indicating a type such as text, a still image, or a moving image. The material type ToM is information provided for each material frame MaF.

The position and size of the material moving image to be fitted into the material frame MaF are defined by setting the reproduction management information for each moving image template. Furthermore, by setting the reproduction management information for each frame Fr, not only a material moving image is fitted into the material frame MaF, but also an animation for the material moving image can be defined.

For example, an animation in which a material moving image moves can be expressed by changing the coordinate information of the material frame MaF.

Furthermore, by changing the size information of the material frame MaF, an animation of zooming in on a predetermined position of the material moving image or an animation of zooming out can be expressed.

Moreover, an animation such as fade-in or fade-out can be expressed by changing the transparency DoC of the material frame MaF.

By setting the reproduction management information for each frame Fr included in the moving image template, a reproduction time length and an animation of the moving image template can be defined.

In a case where the moving image template includes a plurality of scenes Sc, the reproduction management information may include a scene ID. Furthermore, in that case, the frame ID may be reassigned to each scene Sc.

In the following description, a case where the moving image template includes a plurality of scenes Sc will be described as an example.

The material DB 6 stores therein data as a material to be fitted into the material frame MaF set in the moving image template. These materials are text, a still image, a moving image, and the like, and are uploaded to the material DB 6 by the user.

Note that the template DB 5 and the material DB 6 may be configured as computer apparatuses provided outside the information processing apparatus 1. For example, the information processing apparatus 1 including the material DB 6 may be a user terminal, and the template DB 5 may be a server apparatus.

2. Functional Configuration

As illustrated in FIG. 1, the control unit 2 of the information processing apparatus 1 includes a template acquisition unit 21, a material acquisition unit 22, an information acquisition unit 23, a change processing unit 24, and a moving image generation unit 25 in order to realize various functions to be described later.

The template acquisition unit 21 performs processing of acquiring a moving image template designated by a user from the template DB 5.

The material acquisition unit 22 acquires, from the material DB 6, text, a still image, or a moving image as a material to be fitted into the material frame MaF set in the moving image template.

The information acquisition unit 23 acquires information on a length of the moving image template and information on a length of the material moving image to be fitted into the moving image template. Furthermore, the information acquisition unit 23 acquires reproduction management information of the moving image template acquired by the template acquisition unit 21 from the template DB 5.

The change processing unit 24 changes the reproduction management information regarding the moving image template in order to adjust the length of the moving image template in accordance with the length (reproduction time length) of the material moving image. Specifically, in a case where the length of the material moving image is different from the length of a scene Sc into which the material moving image is to be fitted on the moving image template, the reproduction management information of the moving image template is changed as change processing for adjusting the length of the scene Sc in accordance with the length of the material moving image.

For example, in a case where the material moving image to be fitted into the scene Sc is longer than the scene Sc of the moving image template, a frame Fr is added to the scene Sc to match the reproduction time length of the material moving image.

On the other hand, in a case where the material moving image to be fitted into the scene Sc is shorter than the scene Sc of the moving image template, frames Fr of the scene Sc are thinned out to match the reproduction time length of the material time.

Here, the frame Fr included in the moving image template before addition or thinning-out of the frame Fr is referred to as an "initial frame". Furthermore, a frame to be added thereto is referred to as an "additional frame".

The change processing unit 24 adjusts the reproduction time length by changing a frame ID, in other words, by reassigning a frame ID according to such addition or deletion (thinning-out) of the frame Fr.

Furthermore, the change processing unit 24 changes the coordinate information, the vertical size information, the horizontal size information, and the like of the material frame MaF so that an animation set in advance for each scene Sc does not become unnatural due to the addition or deletion of the frame Fr. These changes will be described later again.

The moving image generation unit 25 generates moving image data using the material moving image provided by the user by performing processing such as fitting the material moving image, still image, or text into the material frame MaF.

In the generation of the moving image data, not only the material moving image, still image, or text is fitted into the material frame MaF, but also a transition moving image expressing transition of the scene Sc is synthesized.

3. Configuration of Moving Image Template

Figure 2:
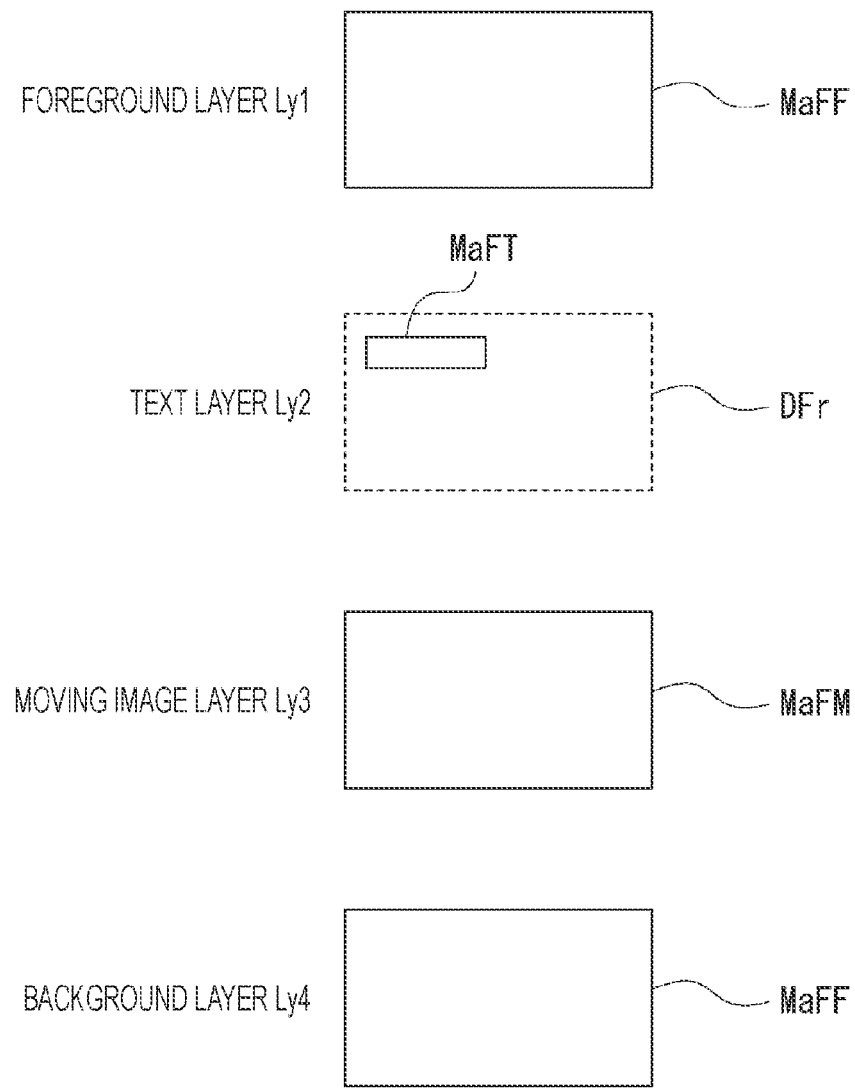
FIG. 2 is a diagram illustrating a configuration example of an M-th frame of a moving image template.
Figure 3:
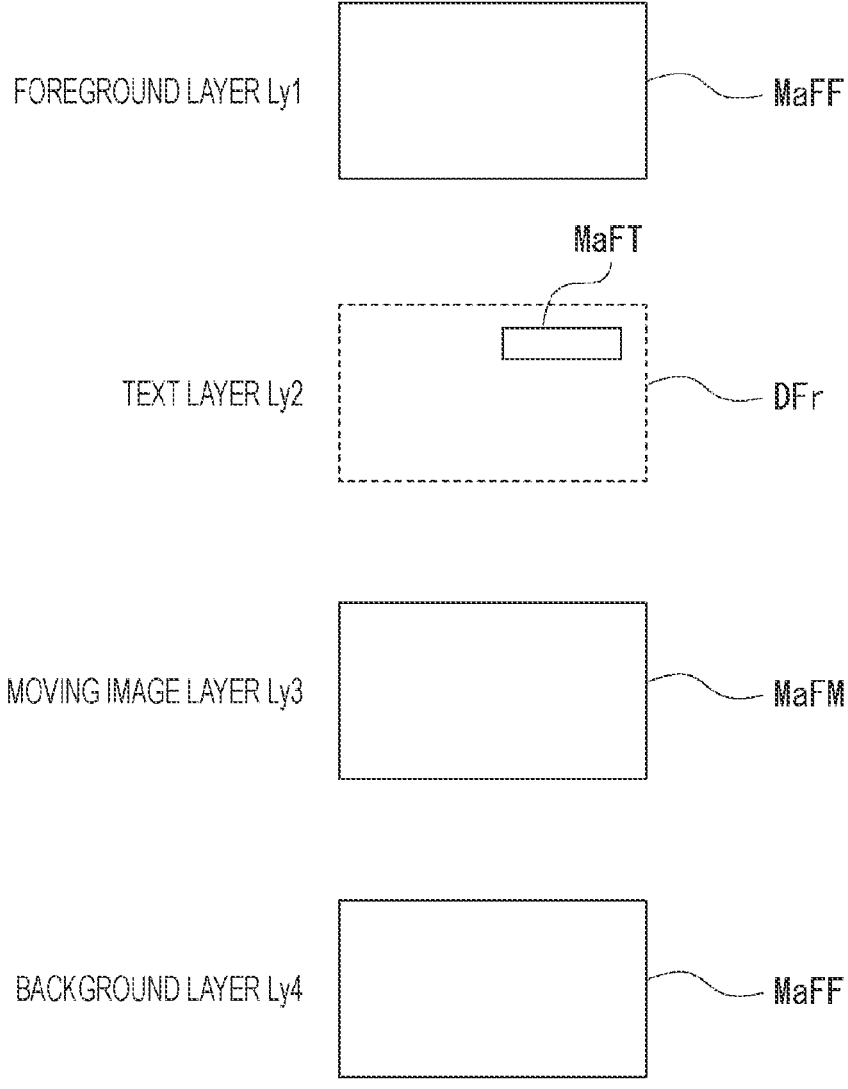
FIG. 3 is a diagram illustrating a configuration example of an (M+1)th frame of the moving image template.

FIGS. 2 and 3 schematically illustrate a configuration of a moving image template.

FIG. 2 schematically illustrates a configuration of an M-th frame Fr(M) in the moving image template, and FIG. 3 schematically illustrates a configuration of an (M+1)th frame Fr(M+1).

As illustrated in FIGS. 2 and 3, each frame Fr includes a plurality of layers Ly.

The frame Fr(M) includes a foreground layer Ly1, a text layer Ly2, a moving image layer Ly3, and a background layer Ly4. Note that the number of layers Ly may vary from one scene Sc to another or may vary from one frame Fr to another. For example, in a case of a scene Sc having no text material, the text layer Ly2 is not included.

The foreground layer Ly1 is a layer Ly arranged on a foremost surface. The text layer Ly2 is the second layer Ly from the front side arranged next to the foreground layer Ly1. The background layer Ly4 is a layer Ly arranged on a backmost surface.

Note that the text layer Ly2 may be arranged in front of the foreground layer Ly1.

In the foreground layer Ly1, a material frame MaFF for a still image having a same size as a display frame DFr is arranged.

A display mode of the material frame MaFF is defined by coordinate information, vertical size information, horizontal size information, transparency DoC, a material type TOM, shape information, and the like that are reproduction management information.

In the text layer Ly2, a material frame MaF for text is arranged on the display frame DFr. Note that there is a plurality of types of material frames MaF, such as one in which text is to be fitted, one in which a still image is to be fitted, and one in which a material moving image is to be fitted. Here, the material frame MaF for text is referred to as a material frame MaFT, the material frame MaF for a still image is referred to as a material frame MaFF, and the material frame MaF for a material moving image is referred to as a material frame MaFM.

A display mode of the material frame MaFF is defined by coordinate information, vertical size information, horizontal size information, transparency DoC, a material type TOM, shape information, and the like that are reproduction management information.

In the moving image layer Ly3, the material frame MaFM for a material moving image having a same size as the display frame DFr is arranged.

A display mode of the material frame MaFM is defined by coordinate information, vertical size information, horizontal size information, transparency DoC, a material type TOM, shape information, and the like that are reproduction management information.

In the background layer Ly4, the material frame MaFF for a still image having a same size as the display frame DFr is arranged.

A display mode of the material frame MaFF is defined by coordinate information, vertical size information, horizontal size information, transparency DoC, a material type TOM, shape information, and the like that are reproduction management information.

The layers Ly illustrated in FIG. 2 are synthesized by moving image generation unit 25, and thereby one image as the frame Fr(M) is generated.

FIG. 3 schematically illustrates a configuration of the frame Fr(M+1), which includes a foreground layer Ly1, a text layer Ly2, a moving image layer Ly3, and a background layer Ly4, as in the frame Fr(M).

The foreground layer Ly1, the moving image layer Ly3, and the background layer Ly4 have configurations similar to those of the frame Fr(M) illustrated in FIG. 2.

In the text layer Ly2, the material frame MaFT for text is arranged on the display frame DFr. The display frame DFr in the text layer Ly2 of the frame Fr(M+1) is different from the display frame DFr in the text layer Ly2 of the frame Fr(M) only in coordinate information.

Therefore, when the frame Fr(M) and the frame Fr(M+1) are successively displayed, it seems to the user as if the material frame MaFT is moving rightward.

That is, the reproduction management information can be rephrased as information defining an animation.

4. Adjustment of Reproduction Time Length of Moving Image Template

<4-1. Deletion of Frame>

In the following description, it is assumed that a frame rate in a moving image template and a frame rate in a material moving image are the same.

As described above, in a case where a material moving image to be fitted into a scene Sc of a moving image template is shorter than the scene Sc, a frame Fr of the scene Sc is deleted. In the following description, each frame of the scene Sc of the moving image template before the deletion of the frame Fr is referred to as a frame Fr, and each frame of the scene Sc of the moving image template after the deletion of the frame Fr is referred to as a frame Fr'. Furthermore, a frame of the material moving image is referred to a frame FrM.

Figure 4:
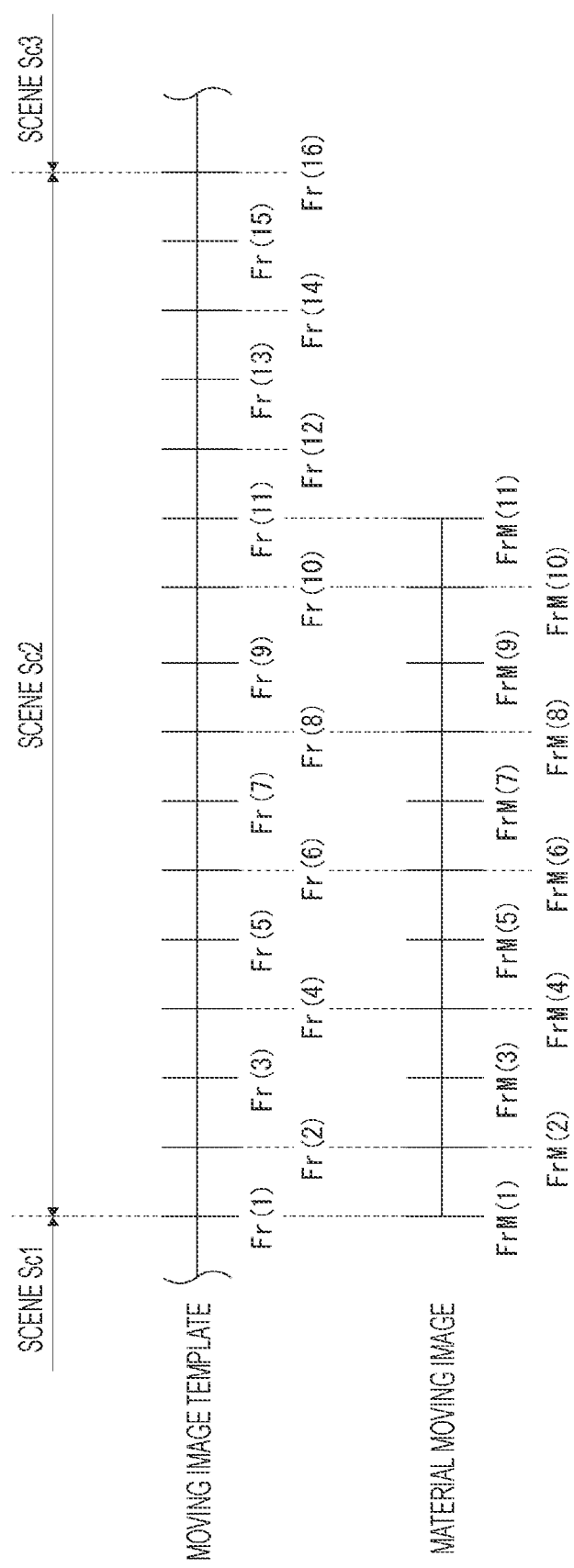
FIG. 4 is a diagram illustrating a difference in the number of frames between the moving image template and a material moving image.
Figure 5:
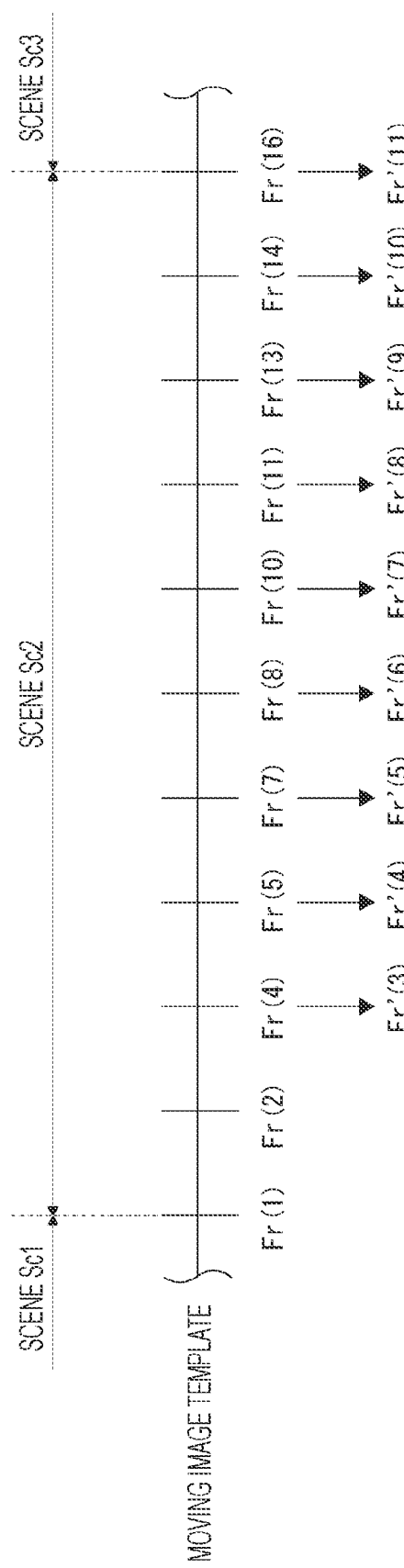
FIG. 5 is a diagram illustrating frames of the moving image template after processing of deleting a frame is performed.

FIGS. 4 and 5 illustrate a specific example.

The moving image template in this example includes at least three scenes Sc1, Sc2, and Sc3.

The scene Sc2 includes 16 frames Fr(1) to Fr(16).

On the other hand, the material moving image to be fitted into the scene Sc2 includes 11 frames FrM(1) to FrM(11).

Since a reproduction time length of one frame Fr and a reproduction time length of one frame FrM are the same, five frames Fr are selected and deleted from the 16 frames Fr(1) to Fr(16) included in the moving image template in order to match a reproduction time length of the material moving image.

Although the five frames Fr to be deleted can be selected in various ways, here, the frames Fr are selected at substantially equal intervals in a time direction. For example, five frames Fr(3), Fr(6), Fr(9), Fr(12), and Fr(15) are selected and deleted.

At this time, as illustrated in FIG. 5, the change processing unit 24 changes a frame ID of each frame Fr that is reproduction management information. Specifically, reproduction management information of the frame Fr' (3) is generated by changing a frame ID of the frame Fr(4) from "4" to "3".

Similarly, a frame ID of the frame Fr(5) is changed from "5" to "4", and a frame ID of the frame Fr(7) is changed from "7" to "5". In this way, the reproduction time length of the specific scene Sc in the moving image template can be adjusted to match the reproduction time length of the material moving image to be fitted.

Note that it is also conceivable that an animation is set in the scene Sc2. For example, assume that an animation in which the material frame MaF moves rightward every frame Fr is set.

In this case, a smooth animation cannot be achieved just by changing a scene ID.

Specifically, coordinate information of the material frame MaF of the frame Fr(1) of the moving image template before frame deletion is (x, y), coordinate information of the material frame MaF of the frame Fr(2) is (x+6, y), coordinate information of the material frame MaF of the frame Fr(3) is (x+12, y), and coordinate information of the material frame MaF of the frame Fr(4) is (x+18, y).

Therefore, when the frame Fr(3) is deleted and the frame ID of the frame Fr(4) is changed to "3 ", that is, when the frame Fr(4) is changed to the frame Fr' (3), coordinate information of the material frames MaF of the frames Fr' (1), Fr' (2), and Fr' (3) after the change is (x, y), (x+6, y), and (x+18, y), respectively. This results in that an animation in which the material frame MaF moves at a constant speed cannot be expressed.

Therefore, it is preferable to change the coordinate information of the material frames MaF together with the change of the frame IDs.

Two examples of a way of changing the coordinate information of the material frames MaF will be given.

In the first example, the coordinate information is changed so as not to change movement start coordinates and movement end coordinates of the animation of the material frame MaF.

The first example is illustrated in FIG. 6 as "Case 1". In this example, the coordinate information of the material frame MaF of the frame Fr(2) is changed from (x+6, y) to (x+9, y) without changing the frame ID. Furthermore, as for the frame Fr(4), the frame ID is changed to "3", and the coordinate information of the material frame MaF is not changed. Moreover, the frame ID of the frame Fr(5) is changed to "4", and the coordinate information of the material frame MaF is changed to (x+27, y).

As a result, the coordinate information of the material frames MaF of the frames Fr' (1), Fr' (2), Fr' (3), and Fr' (4) becomes (x, y), (x+9, y), (x+18, y), and (x+27, y), respectively. Therefore, it is possible to express an animation in which the material frame MaF moves at a constant speed without changing the movement start coordinates and the movement end coordinates of the animation of the material frame MaF.

In the second example, the coordinate information is changed so as not to change a moving speed of the material frame MaF in the animation before and after the change.

The second example is illustrated in FIG. 6 as "Case 2". In this example, the frame ID of the frame Fr(4) is changed to "3", and the coordinate information of the material frame MaF is changed from (x+18, y) to (x+12, y). Similarly, the frame ID of the frame Fr(5) is changed to "4", and the coordinate information of the material frame MaF is changed from (x+24, y) to (x+18, y).

As a result, the reproduction time length can be adjusted while maintaining the moving speed of the material frame MaF defined in the moving image template, that is, while maintaining the state in which an amount of movement of the material frame MaF between the frames Fr' is set to "6".

By changing the reproduction management information as illustrated in the first example and the second example, the reproduction time length can be adjusted according to an intention of a creator who created the moving image template.

<4-2. Addition of Frame>

As described above, in a case where a material moving image to be fitted into a scene Sc of a moving image template is longer than the scene Sc, a frame Fr is added to the scene Sc. Note that the following discusses, as an example, a scene Sc in which an animation in which the material frame MaF moves at a constant speed is set. Furthermore, in the following description, each frame of the scene Sc of the moving image template before the addition of the frame Fr is referred to as a frame Fr, and each frame of the scene Sc of the moving image template after the addition of the frame Fr is referred to as a frame Fr'. Furthermore, a frame of the material moving image is referred to a frame FrM.

As the addition of the frame Fr, "interpolation" in which coordinate information is changed so as not to change movement start coordinates and movement end coordinates of the material frame MaF in the animation, and "extrapolation" in which the coordinate information is changed so as not to change a movement speed of the material frame MaF in the animation before and after the change are conceivable.

First, "interpolation" of the frame Fr will be described.

Figure 7:
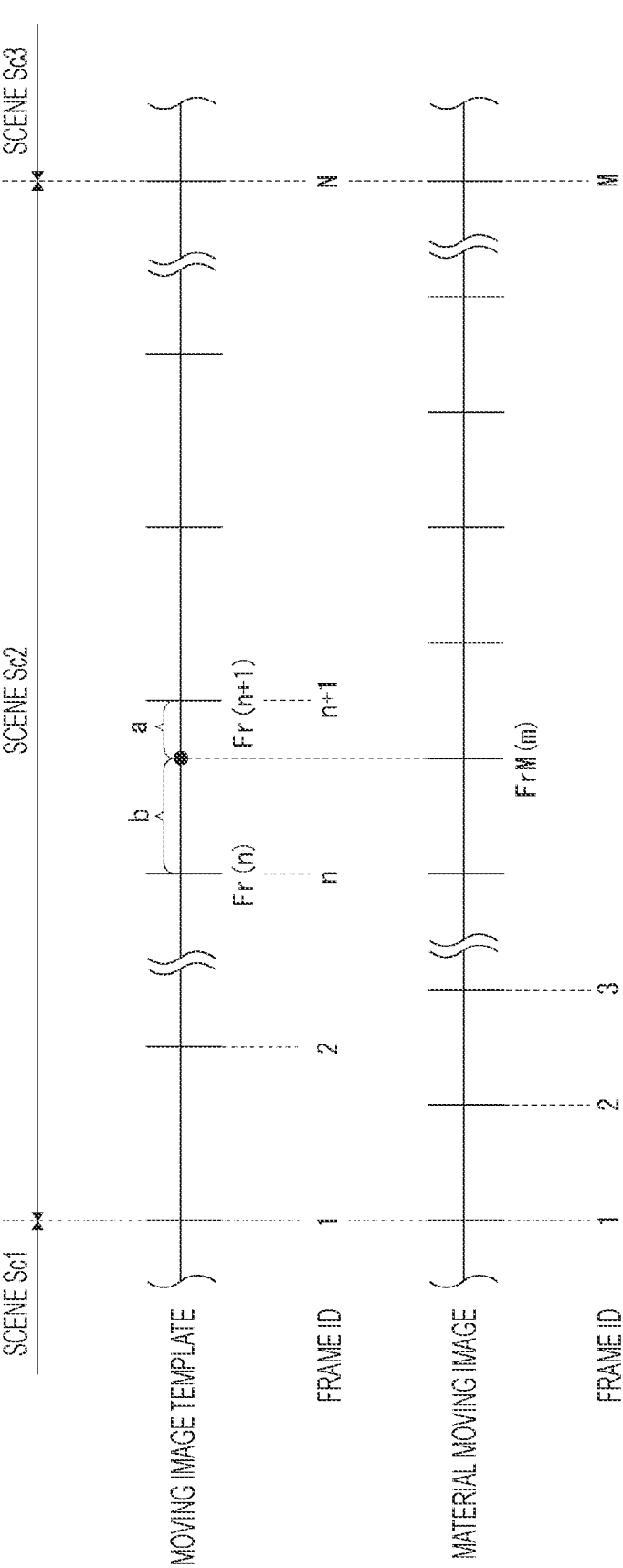
FIG. 7 is a diagram illustrating a difference in the number of frames between the moving image template and the material moving image before interpolation.

FIG. 7 illustrates a relationship between the frames Fr included in the scene Sc2 of the moving image template before the interpolation of the frame Fr and the frames FrM of the material moving image to be fitted into the scene Sc2.

Specifically, the number of frames of the scene Sc2 of the moving image template before the interpolation is N. Furthermore, the number of frames of the material moving image is M (>N).

A frame Fr is added to the moving image template so that the frames FrM of the material moving image and Fr' of the moving image template correspond on a one-to-one basis, that is, the number of frames of the scene Sc2 of the moving image template after the interpolation becomes M.

The change processing unit 24 changes the reproduction management information for each frame Fr' of the moving image template after the interpolation.

Figure 8:
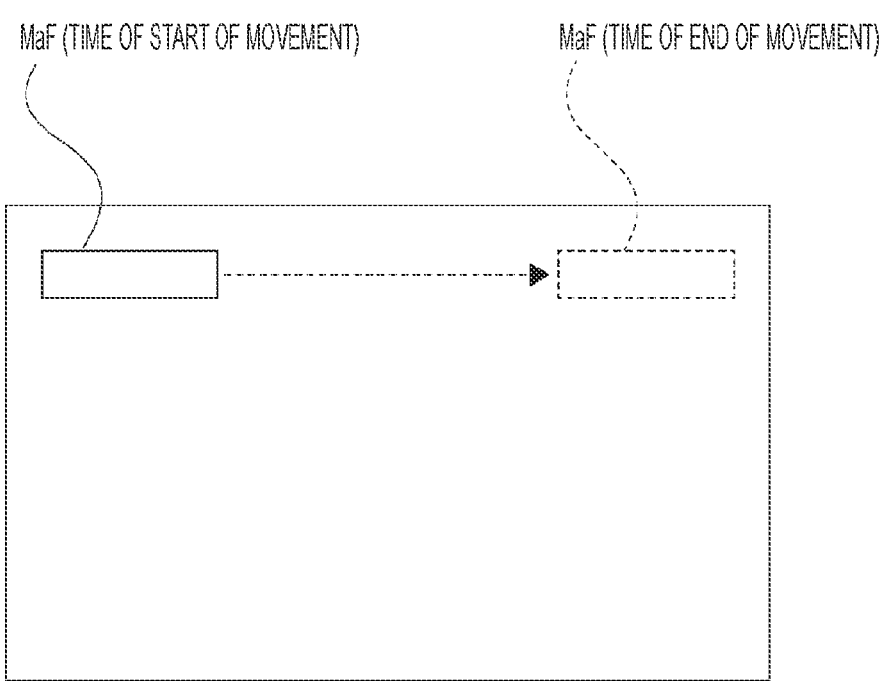
FIG. 8 is a diagram illustrating an example of a relationship between movement start coordinates and movement end coordinates of a material frame in a case where interpolation of a frame is performed.

In this example, as illustrated in FIG. 8, the coordinate information is changed so as not to change movement start coordinates and movement end coordinates of the animation of the material frame MaF. Therefore, FIG. 7 can be regarded as representing the coordinate information of the material frame MaF as the horizontal axis.

That is, in a case where the coordinate information of the material frame MaF in the frame Fr(1) of the scene Sc2 of the moving image template before the interpolation is (x, y) and the coordinate information of the material frame MaF in the frame Fr(N) of the scene Sc2 of the moving image template before the interpolation is (x+c, y), the coordinate information of the material frame MaF in the frame Fr' (1) of the scene Sc2 of the moving image template after the interpolation is (x, y), and the coordinate information of the material frame MaF in the frame Fr' (M) of the scene Sc2 of the moving image template after the interpolation is (x+c, y).

The reproduction management information of the frame Fr' of the scene Sc2 of the moving image template is changed (set) on the basis of the reproduction management information of the frame Fr of the moving image template before the addition. Specifically, the reproduction management information of each frame Fr' is changed by using linear interpolation.

First, positions in the axial direction of the frame Fr(1) of the moving image template and the frame FrM(1) of the material moving image are adjusted to match each other, and positions in the axial direction of the frame Fr(N) of the moving image template and the frame FrM(M) of the material moving image are adjusted to match each other.

The reproduction management information of a frame Fr' (m) of the scene Sc2 of the moving image template corresponding to an m-th frame FrM(m) of the material moving image is changed according to a positional relationship between two closest frames Fr(n) and Fr(n+1) before and after a time of the frame FrM(m) among the frames Fr of the moving image template before addition of the frame Fr.

Specifically, the coordinate information of the material frame MaF is changed according to a distance a between the frame FrM(m) and the frame Fr(n+1) and a distance b between the frame FrM(m) and the frame Fr(n).

For this purpose, first, a scale value s is obtained. The scale value s is a value representing a ratio of the number of frames of the scene Sc2 of the moving image template before and after the interpolation, and can be calculated by the following Formula (1).

$$\text{Scale value } s = (N-1)/(M-1) \qquad \text{Formula (1)}$$

Furthermore, n of the frame Fr(n) can be calculated by the following Formula (2).

$$n = \text{integer}(s \cdot m) \qquad \text{Formula (2)}$$

Here, the integer ( ) function is a function that returns a maximum integer that does not exceed an argument. That is, the Formula (2) is a formula that returns an integer part of (s·m), which is an argument.

The distance b can be calculated by the following Formula (3).

$$b = \text{float}(s \cdot m) \qquad \text{Formula (3)}$$

Here, the float ( ) function is a function that returns a fractional part of an argument. That is, the Formula (3) is a formula that returns a fractional part of (s·m), which is an argument.

The distance a can be calculated by the following Formula (4).

$$a = 1 - b \qquad \text{Formula (4)}$$

The reproduction management information of the frame Fr' (m) of the scene Sc2 of the moving image template corresponding to the m-th frame FrM(m) of the material moving image can be calculated by using the distance a and the distance b.

Specifically, in a case where the coordinate information of the material frame MaF in the frame Fr(n) of the scene Sc2 of the moving image template before the interpolation is (d, y) and the coordinate information of the material frame MaF in the frame Fr(n+1) of the scene Sc2 of the moving image template before the interpolation is (e, y), the coordinate information of the material frame MaF in the frame Fr' (m) of the scene Sc2 of the moving image template corresponding to the m-th frame FrM(m) of the material moving image is (a·d+e·b, y).

The formula (a·d+e·b) can be used not only for calculating the coordinate information but also for calculating other reproduction management information.

By using interpolation, the reproduction time length can be adjusted without changing the movement start coordinates and the movement end coordinates of the material frame MaF set in advance.

However, according to the reproduction management information thus calculated, an animation expressed by a small number of frames Fr is expressed by a larger number of frames Fr'. Since a display time of each frame Fr is same as that of another frame Fr, movement of a material between the frames Fr' becomes slow, and an effect of the animation becomes weak.

FIG. 9 illustrates an example of change of the reproduction management information in a case where interpolation is performed. As illustrated in FIG. 9, in the interpolation, a change amount of coordinates of the material frame MaF between frames is changed from "6" to "4" since a new frame is added between the frames Fr.

In order to avoid such a situation where an effect of an animation is weakened, extrapolation may be performed instead of interpolation of the frame Fr.

"Extrapolation" of the frame Fr will be described.

Figure 10:
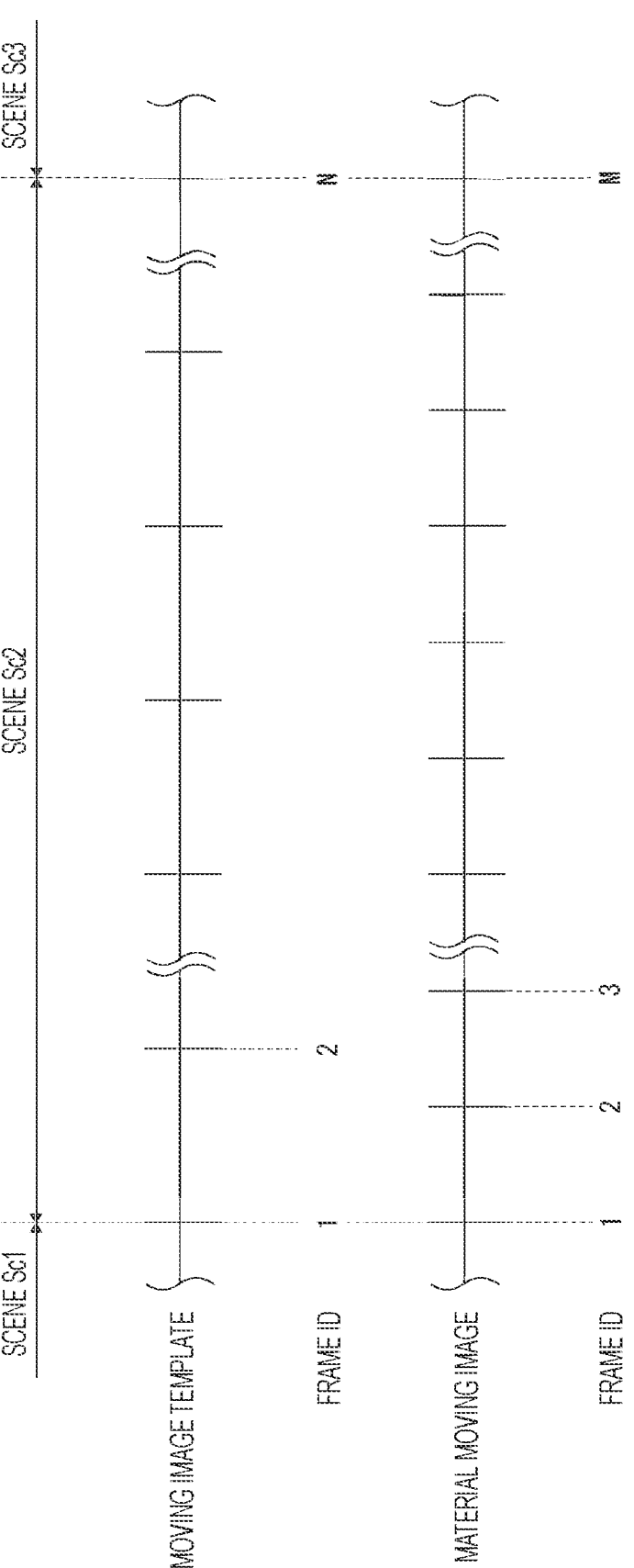
FIG. 10 is a diagram illustrating a difference in the number of frames between the moving image template and the material moving image before extrapolation.

As illustrated in FIG. 10, the number of frames of the scene Sc2 of the moving image template before extrapolation is N, and the number of frames of the material moving image is M (>N).

In the extrapolation, a frame Fr is added to the moving image template so that the frames FrM of the material moving image and Fr' of the moving image template correspond on a one-to-one basis, as in the interpolation.

The change processing unit 24 changes the reproduction management information for each frame Fr' of the moving image template after the extrapolation.

In the extrapolation, the coordinate information is changed so as not to change an amount of change of the material frame MaF in an animation.

For example, an amount of movement of the material frame MaF between the frames Fr is set to "5" such that coordinate information of the material frame MaF in the frame Fr(1) of the scene Sc2 of the moving image template before the extrapolation is (x, y), coordinate information of the material frame MaF in the frame Fr(2) is (x+5, y), and coordinate information of the material frame MaF in the frame Fr(3) is (x+10, y).

In this case, coordinate information of the material frame MaF in the frame Fr' (1) of the scene Sc2 of the moving image template after the extrapolation is (x, y), coordinate information of the material frame MaF in the frame Fr' (2) is (x+5, y), and coordinate information of the material frame MaF in the frame Fr' (3) is (x+10, y).

That is, until the N-th frame, the coordinate information of the material frame MaF in the frame Fr and the coordinate information of the material frame MaF in the frame Fr' are the same.

Since coordinate information of the material frame MaF in the N-th frame Fr' is (x+5·(N−1), y), coordinate information of the material frame MaF in an (N+1)th frame Fr' (N+1) is (x+5·N, y).

Note that a frame ID is not changed except for an added frame Fr'.

As described above, in extrapolation of a frame, the reproduction management information is changed so as not to change a change amount of the reproduction management information between frames before and after the extrapolation.

Figure 11:
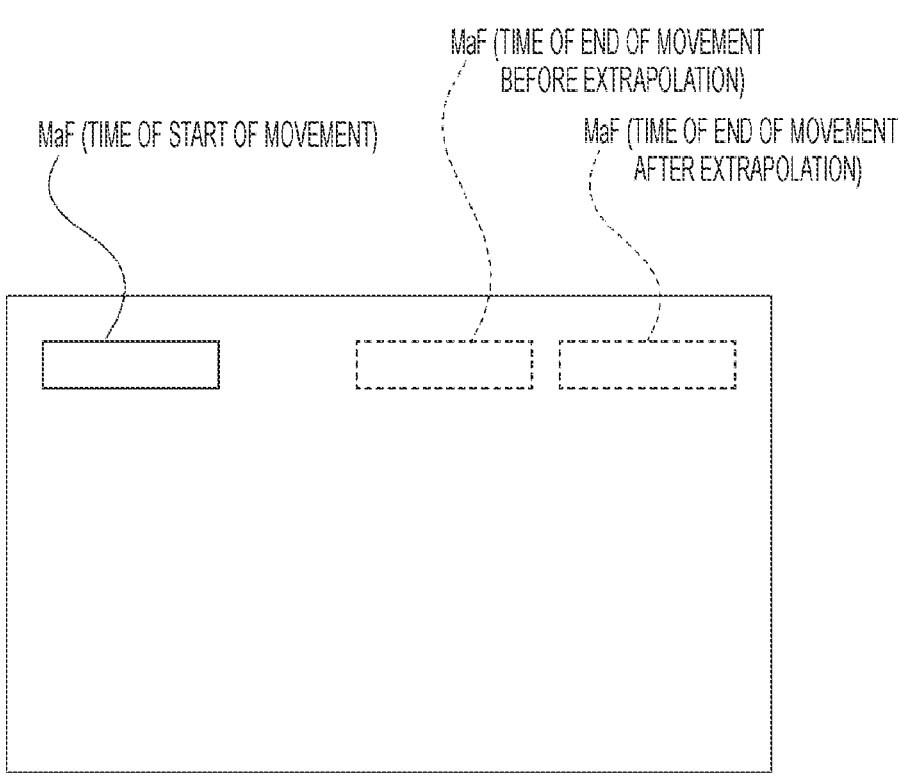
FIG. 11 is a diagram illustrating an example of a relationship between movement start coordinates and movement end coordinates of a material frame in a case where extrapolation is performed.

Therefore, an amount of movement of the material frame MaF from movement start coordinates to movement end coordinates in an animation is larger after the extrapolation than before the extrapolation (see FIG. 11).

Furthermore, by making a coordinate change between initial frames and a coordinate change between additional frames the same, a speed of movement of the material is made constant throughout the entire scene Sc2. Therefore, even in a case where the reproduction time length is adjusted, a consistent animation can be expressed.

Note that although the coordinate change of the material frame MaF is made constant here, an enlargement ratio of the material frame MaF may be made constant. For example, a display size of the material frame MaF in a certain frame Fr' may be 100%, a display size of the material frame MaF in a next frame Fr' may be 110%, which is 1.1 times larger, and a display size of the material frame MaF in a next frame Fr' may be 121%, which is 1.1 times larger.

Furthermore, the enlargement ratio may be set to less than 100%, in which case, the enlargement ratio indicates reduction.

Even in a case where the reproduction management information is changed so that the enlargement ratio is kept the same among frames Fr', the reproduction time length can be adjusted while securing a consistent animation from beginning to end of the scene Sc.

FIG. 12 illustrates an example of change of the reproduction management information in a case where extrapolation is performed. As illustrated in FIG. 12, in the extrapolation, no new frame is added between the frames Fr, and a new frame is added after the last frame Fr(11), so that the reproduction time length is adjusted in a state where the change amount of coordinates of the material frame MaF between frames is maintained at "6".

In order to avoid such a situation where an effect of an animation is weakened, extrapolation may be performed instead of interpolation of the frame Fr.

Note that although a new frame is added after the last frame Fr(11) in the example of the extrapolation illustrated in FIG. 12, a new frame may be added before the first frame Fr(1) or a new frame may be added to both before the first frame Fr(1) and after the last frame Fr(11).

In a case where a new frame is added before the first frame Fr(1), movement start coordinates of the material frame MaF are different before and after extrapolation. Specifically, coordinate information of the material frame MaF in a new frame Fr' added as a frame immediately preceding the first frame Fr(1) is (x−6, y).

Note that interpolation and extrapolation may be used together.

In a case where interpolation is used, an amount of movement of the material frame MaF becomes small, and an effect of an animation is weakened, as described above. However, it is conceivable that some degree of reduction in amount of movement of the material frame MaF does not matter. In view of this, a new frame may be added by interpolation as long as an amount of movement of the material frame MaF is equal to or larger than a threshold value, and extrapolation may be performed as for a frame to be further added.

FIG. 13 illustrates an example of a case where half of an amount of movement of the material frame MaF before addition of a frame is set as a threshold value.

The number of frames before the change is "6", and the number of frames after the change is "14".

As illustrated in FIG. 13, if all frames to be added are interpolated, an amount of movement of the material frame MaF falls below "3", which is a half of "6". However, in a case where three frames given frame IDs of "12", "13", and "14" after addition are added by extrapolation, the reproduction time length can be adjusted without making an amount of movement of the material frame MaF less than the threshold value "3".

Note that which of frame interpolation and extrapolation is used may be determined, for example, by a creator of a moving image template at a time of preparing the moving image template in consideration of an effect of an animation or the like.

In this case, an interpolation flag and an extrapolation flag are prepared for each moving image template, and either the interpolation flag or the extrapolation flag is set by the creator or the like.

In a case where either the interpolation flag or the extrapolation flag has been already set, either extrapolation or interpolation is selected on the basis of the flag at the time of addition of a frame.

5. Transition Layer

In a case where a plurality of scenes Sc is included in the moving image template, a transition moving image for expressing transition between the scenes Sc is used in some cases so as not to give an impression that the scene Sc is suddenly changed by simply continuing the scenes Sc.

The transition moving image is arranged in a transition layer Ly0. The transition layer Ly0 is arranged in front of the foreground layer Ly1.

Here, a mode of the transition moving image will be described.

In a first example, the transition moving image has the same number of frames as the moving image template.

In a process of adjusting the number of frames of the moving image template to match the number of frames of the material moving image, processing of adjusting the number of frames of the transition moving image to match the number of frames of the material moving image is also performed. Specifically, processing of changing a frame ID of the transition moving image is performed.

The transition moving image includes a visible frame VFr arranged in the vicinity of switching between scenes Sc to express transition between the scenes Sc and an invisible frame NVFr arranged between the visible frames VFr.

In the visible frame VFr, a visible still image or moving image is arranged in at least a partial region, and the visible frame VFr is synthesized with a corresponding frame in the moving image template, that is, synthesized with materials such as text, a still image, or a moving image arranged in the material frames MaF, MaFT, MaFF, and MaFM of the corresponding frame Fr, and thereby the synthesized frames are visually recognized by a user as one image.

By synthesizing the visible frame VFr over a plurality of frames, an animation expressing transition between the scenes Sc is realized.

The invisible frame NVFr is a frame in which nothing is arranged in an entire region, and synthesizing the invisible frame NVFr with materials such as text, a still image, or a moving image arranged in the material frames MaF, MaFT, MaFF, and MaFM has no influence on an animation, display, or the like of the materials.

In other words, there is no difference in display between a case where the invisible frame NVFr is synthesized and a case where the invisible frame NVFr is not synthesized.

The invisible frame NVFr is provided for adjustment of the number of frames. Therefore, since a corresponding frame of the transition moving image is provided for each frame FrM of the material moving image, it is unnecessary to perform, for each frame, processing such as determining whether or not to synthesize the transition moving image.

Figure 14:
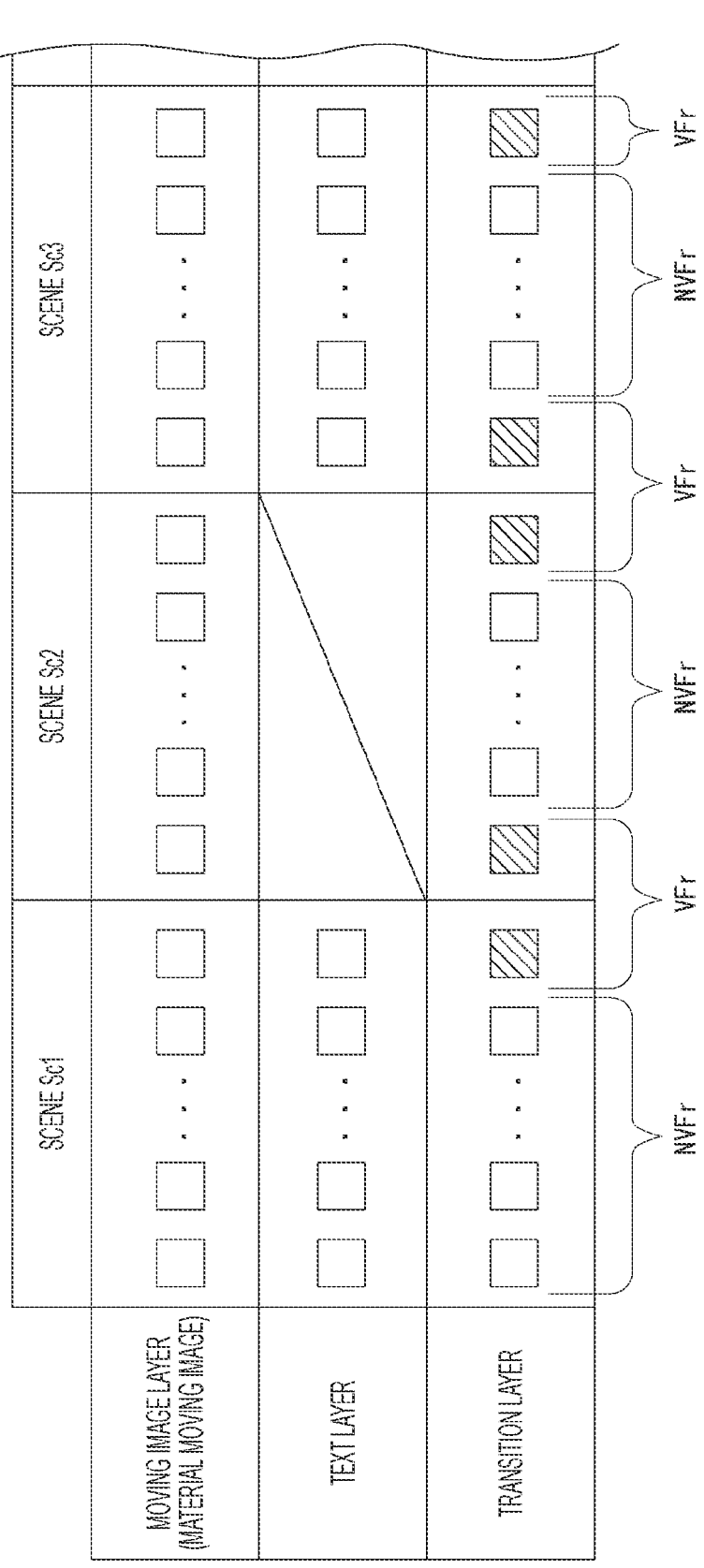
FIG. 14 is a diagram for explaining visible frames and invisible frames in a transition layer.

FIG. 14 illustrates a specific example. In FIG. 14, the visible frame VFr is hatched, and the invisible frame NVFr is not hatched.

In FIG. 14, in a moving image template including at least scenes Sc1 to Sc3, the visible frame VFr is arranged at a joint between scenes Sc.

Furthermore, although there is a layer Ly, such as the text layer Ly2, in which no material is provided depending on the scene Sc, frames corresponding to all the frames Fr included in the moving image template are provided in the transition layer Ly0.

In a second example, the transition moving image has a different number of frames from the moving image template. That is, the transition layer Ly0 includes only the visible frame VFr described above.

Figure 15:
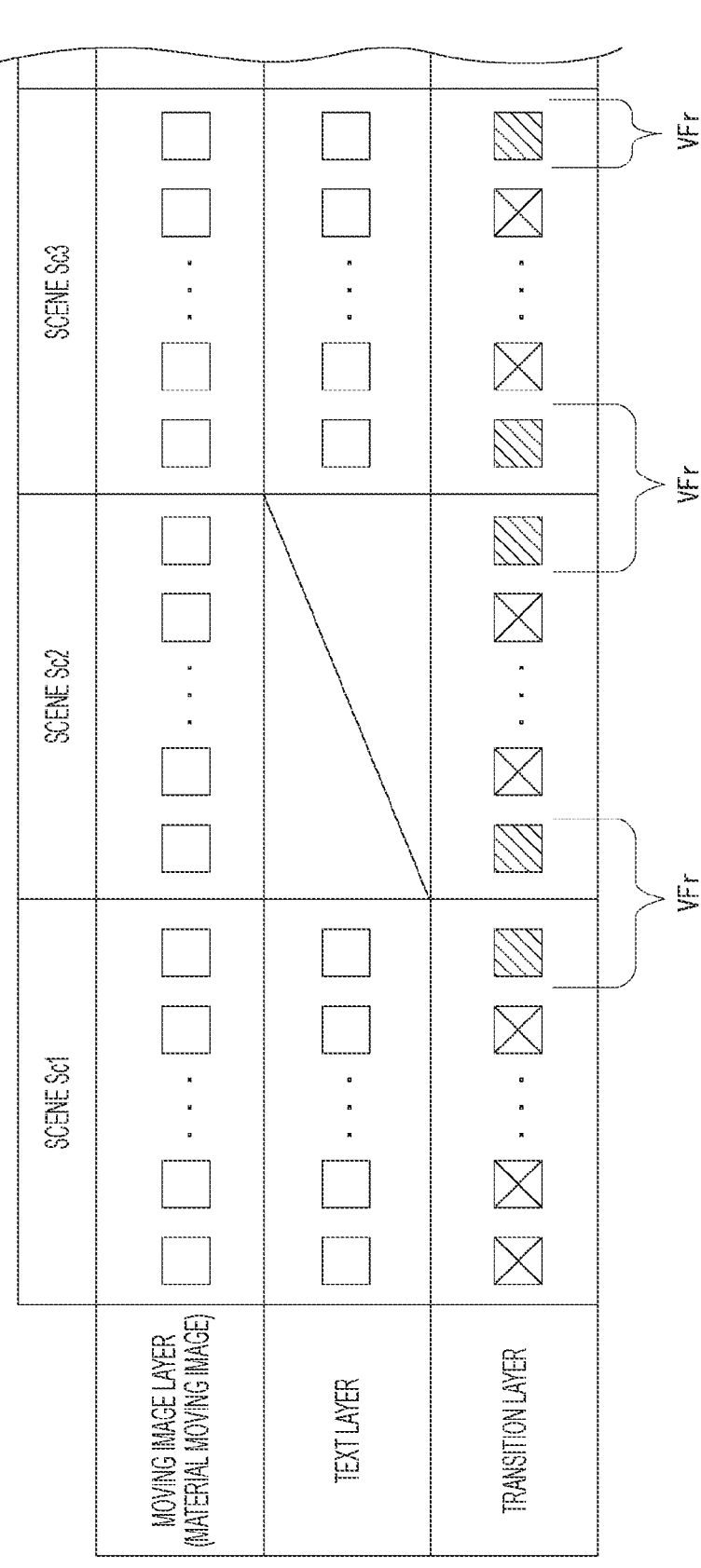
FIG. 15 is an explanatory diagram of a case where the transition layer includes no invisible frame.

An example is illustrated in FIG. 15. In FIG. 15, the visible frame VFr is hatched. Furthermore, FIG. 15 shows that no invisible frame NVFr is provided.

As a result, a data amount of the transition layer Ly0 is reduced. Furthermore, a frame ID of each frame of the transition moving image is assigned in a display order while regarding an ID assigned to the invisible frame NVFr in the above example as a missing number.

<5-1. Deletion of Frame of Transition Moving Image>

A frame of the transition moving image is deleted as appropriate according to deletion of a frame Fr of the moving image template.

Figure 16:
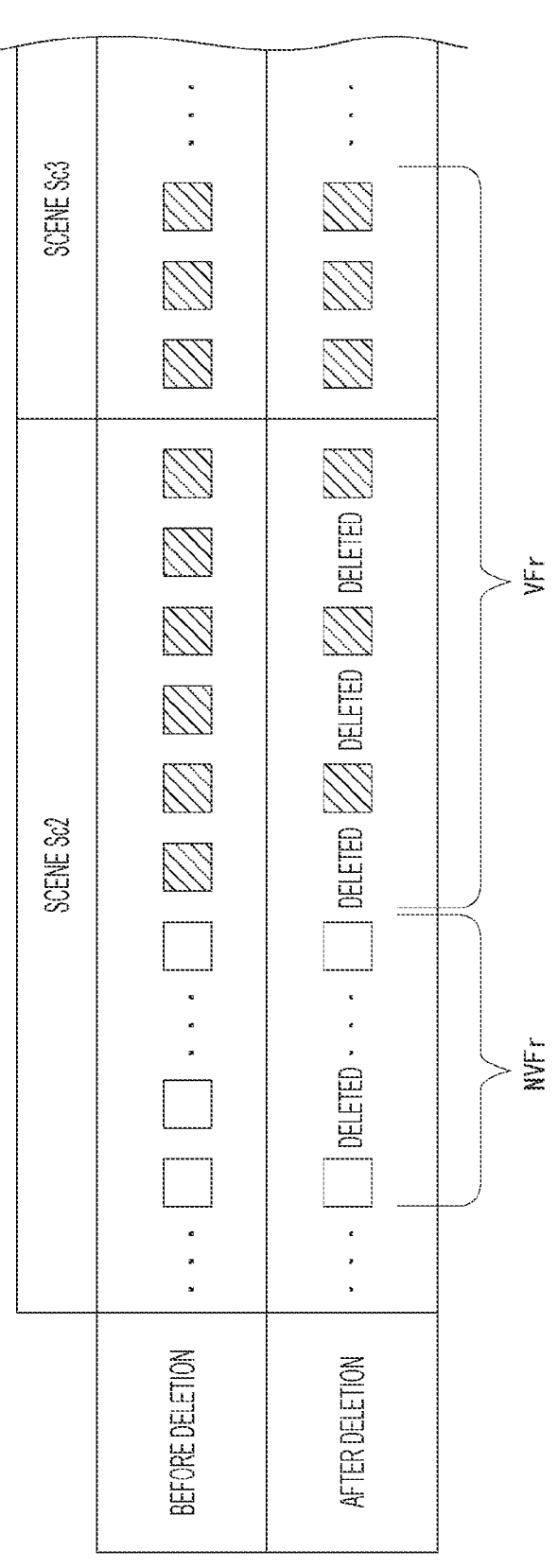
FIG. 16 is a diagram for explaining frame deletion in the transition layer.

An example is illustrated in FIG. 16.

FIG. 16 illustrates a transition moving image near a joint between the scene Sc2 and the scene Sc3. Furthermore, a case where half of the frames Fr of the moving image template is deleted is illustrated.

Before deletion of the frames of the transition moving image, the visible frame VFr is arranged in the last six frames of the scene Sc2. In a case where half of the frames Fr of the moving image template is deleted, about half of the visible frames VFr is also deleted in the transition moving image.

Furthermore, the transi moving image for expressing transition from the scene Sc2 to the scene Sc3 is realized by arranging the visible frame VFr from end of the scene Sc2 to beginning of the scene Sc3. However, as for the visible frame VFr arranged at the beginning of the scene Sc3, addition or deletion is made according to adjustment of the number of frames of the scene Sc3. Therefore, in a case where the number of frames of the scene Sc3 is increased according to a length of a material moving image to be fitted into the scene Sc3, the visible frame VFr is not added. Addition of a frame of the transition moving image resulting from an increase in the number of frames will be described later.

Note that, in a case where the visible frame VFr is deleted in the scene Sc2, one or some visible frames VFr corresponding to the scene Sc3 may be deleted even in a case where the number of frames of the scene Sc3 is increased.

Furthermore, although FIG. 16 illustrates an example in which the transition moving image includes the invisible frame NVFr, the transition moving image need not necessarily include the invisible frame NVFr. In this case, only the visible frame VFr is deleted (thinned out).

<5-2. Addition of Frame of Transition Moving Image>

A frame of the transition moving image is added as appropriate according to addition of a frame Fr of the moving image template.

Figure 17:
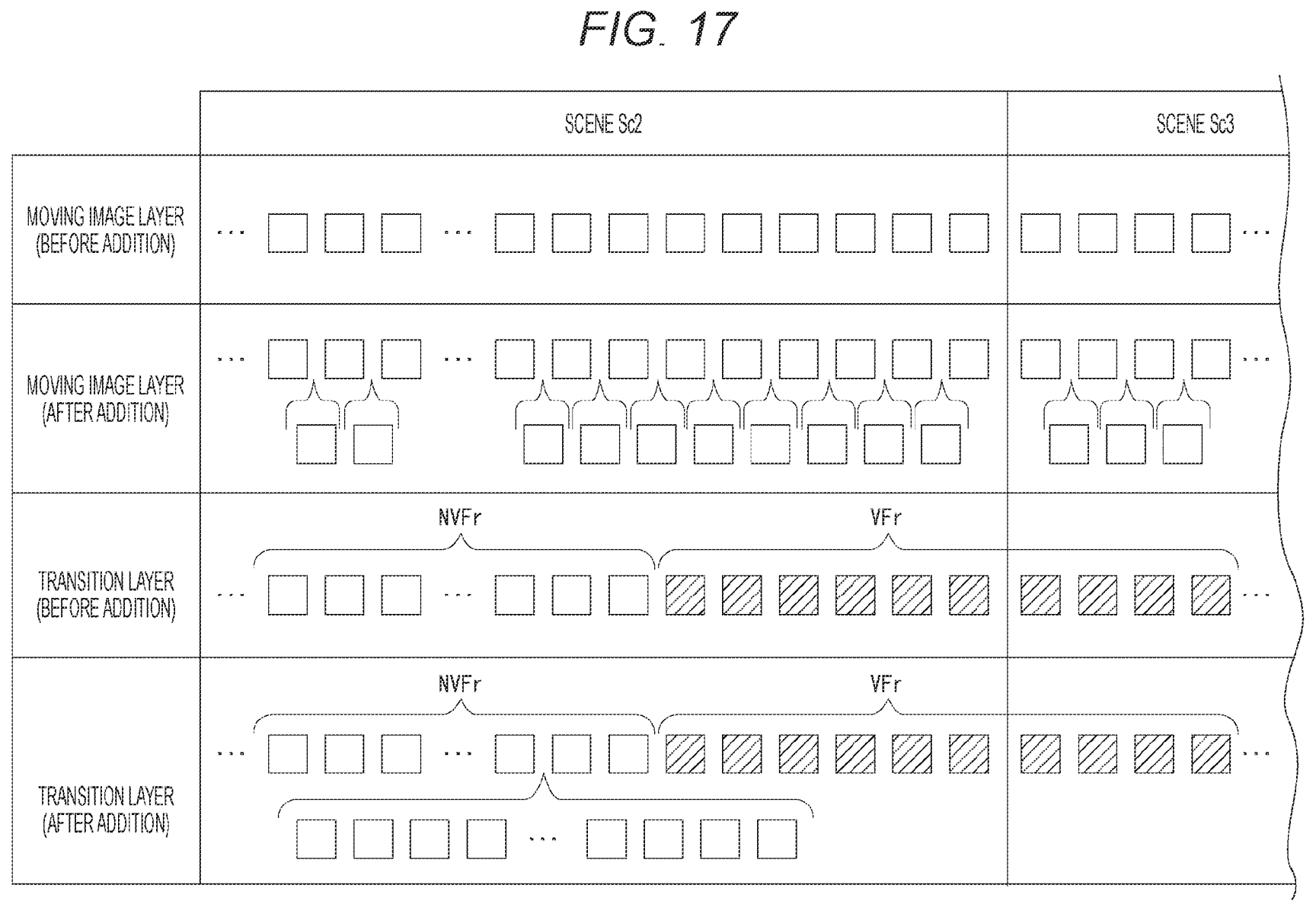

An example is illustrated in FIG. 17.

Note that FIG. 17 illustrates an example of a case where a reproduction time length of a moving image template is substantially doubled by adding a frame Fr of the moving image template in accordance with a reproduction time length of a material moving image.

A single additional frame is added between every adjacent frames of the moving image layer Ly3 of the moving image template in the scene Sc2.

Accordingly, in the transition layer Ly0 in the scene Sc2, as many invisible frames NVFr as necessary are duplicated and inserted between invisible frames NVFr. That is, the duplicate invisible frames NVFr are inserted between the invisible frames NVFr.

As a result, even in a case where a frame Fr is added as adjustment of the reproduction time length of the moving image template, an amount of change in an animation between frames of the transition moving image expressing transition between the scenes Sc is not affected.

Note that, in a case where only the visible frame VFr is provided as in the second example of the transition moving image illustrated in FIG. 15, no frame is added to the transition moving image. In this case, only a frame ID of the transition moving image is changed.

There are several possible methods for selecting the invisible frame NVFr to be duplicated. For example, since the visible frame VFr is arranged near the joint between the scenes Sc, a frame arranged at a center of the scene Sc, specifically, a frame displayed at a time of 1 minute and 30 seconds is regarded as an invisible frame NVFr and duplicated in a case where the reproduction time length of the scene Sc2 is 3 minutes. Then, the duplicate frames are inserted before and after the original frame.

For this purpose, it is only necessary that the visible frame VFr is not arranged at the center of the scene Sc. For example, the number of visible frames VFr is kept less than a predetermined number.

Furthermore, also in insertion of the invisible frame NVFr, the frame ID is changed so that the visible frame VFr is not arranged at the center of the scene Sc.

Note that, in a case where the visible frame VFr is arranged up to the center of the scene Sc, the selection of the invisible frame to be duplicated and the selection of the insertion position are performed in consideration of the length of the animation of the transition layer Ly0.

6. Frame Synthesis

By synthesizing the elements included in the layers Ly adjusted as described above, an image as one frame of a moving image viewed by a user is generated. Here, the generated frame is referred to as an "output frame".

The elements to be synthesized are classified into three types below.

A first type is a material such as text, a still image, or a moving image provided by the user. This is referred to as a "material".

A second type is the default still image described above arranged on a frame of the moving image template. This is referred to as a "default image".

A third type is a transition moving image.

Figure 18:
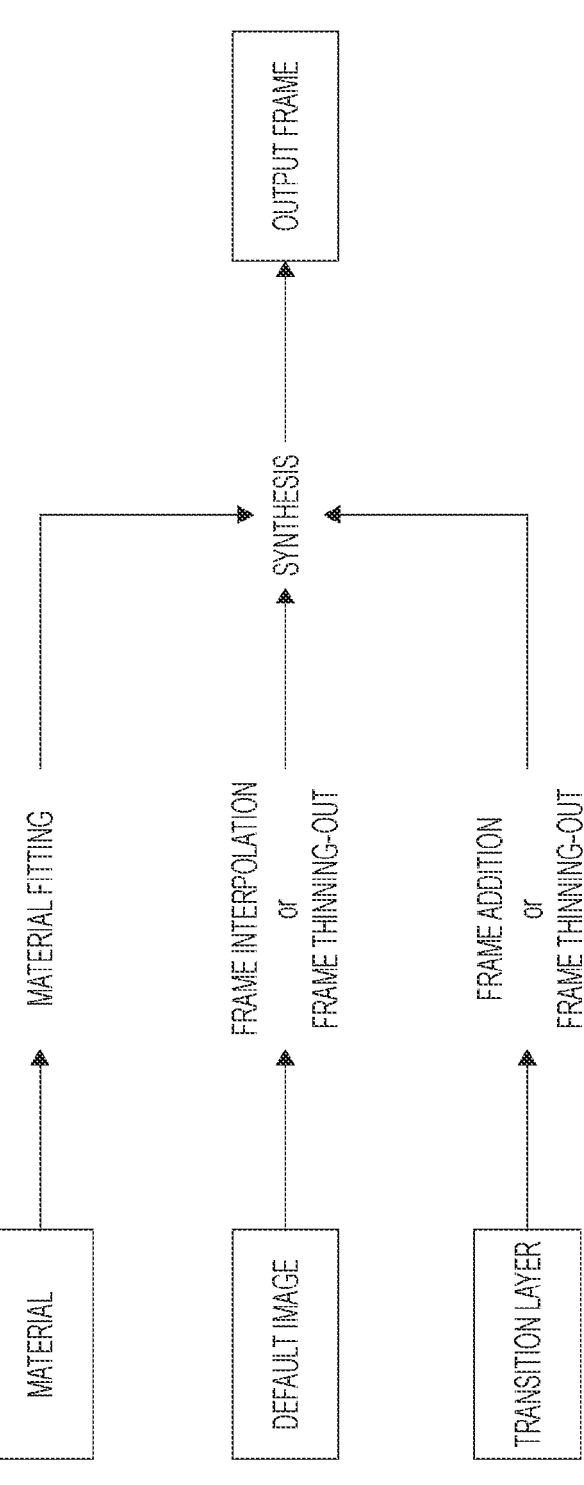
FIG. 18 is a diagram for explaining layer synthesis.

As illustrated in FIG. 18, the material is fitted into a predetermined position of the moving image template whose reproduction time length has been adjusted.

As for the default image, frame interpolation or frame thinning-out is performed according to the adjustment of the reproduction time length of the moving image template. Furthermore, processing such as changing a frame ID is performed.

As for the transition moving image, thinning-out of the visible frame VFr or addition or thinning-out of the invisible frame NVFr is performed. Furthermore, processing such as changing a frame ID is performed.

The output frame is generated by synthesizing these three elements. Note that the synthesis is performed for frames having a same frame ID.

7. User Interface

A tool T for creating a moving image using a moving image template is provided to a user who prepares various materials such as a material moving image.

Here, an example of a user interface of the tool T will be described with reference to FIG. 19.

In the tool T, a preview display portion 31 in which a preview of a material moving image selected by the user is displayed or reproduced, a reproduction stop button 32 arranged below the preview display portion 31 and used to reproduce and stop the material moving image, a seek bar 33 arranged on the right of the reproduction stop button 32, a radio button 34 used to determine a reproduction time length of the material moving image, and an input field 35 used to input the reproduction time length are arranged.

The reproduction stop button 32 functions as a reproduction button while a moving image is stopped and functions as a stop button while a moving image is reproduced.

The seek bar 33 indicates a position with respect to the reproduction time length of the material moving image. A knob 36 indicating a reproduction range is arranged on the seek bar 33.

The knob 36 is an operator that has a substantially rectangular shape and can be moved left and right on the seek bar 33 by a drag operation. Furthermore, a length of the knob 36 in a time direction can be changed.

Therefore, a left end and right end of the knob 36 can be changed.

By changing the length of the knob 36, a range of the material moving image to be fitted into a predetermined scene Sc of the moving image template can be designated as a reproduction range.

For example, in a case where the reproduction time length of the material moving image is 10 minutes, a left end of the seek bar 33 indicates a time point of 0 minute of the material moving image, and a right end indicates a time point of 10 minutes of the material moving image.

For example, by extending the left end of the knob 36 to the left end of the seek bar 33 and extending the right end of the knob 36 to the right end of the seek bar 33, that is, by changing the shape of the knob 36 so as to cover the entire seek bar 33, the entire material moving image can be designated as the reproduction range.

Figure 19:
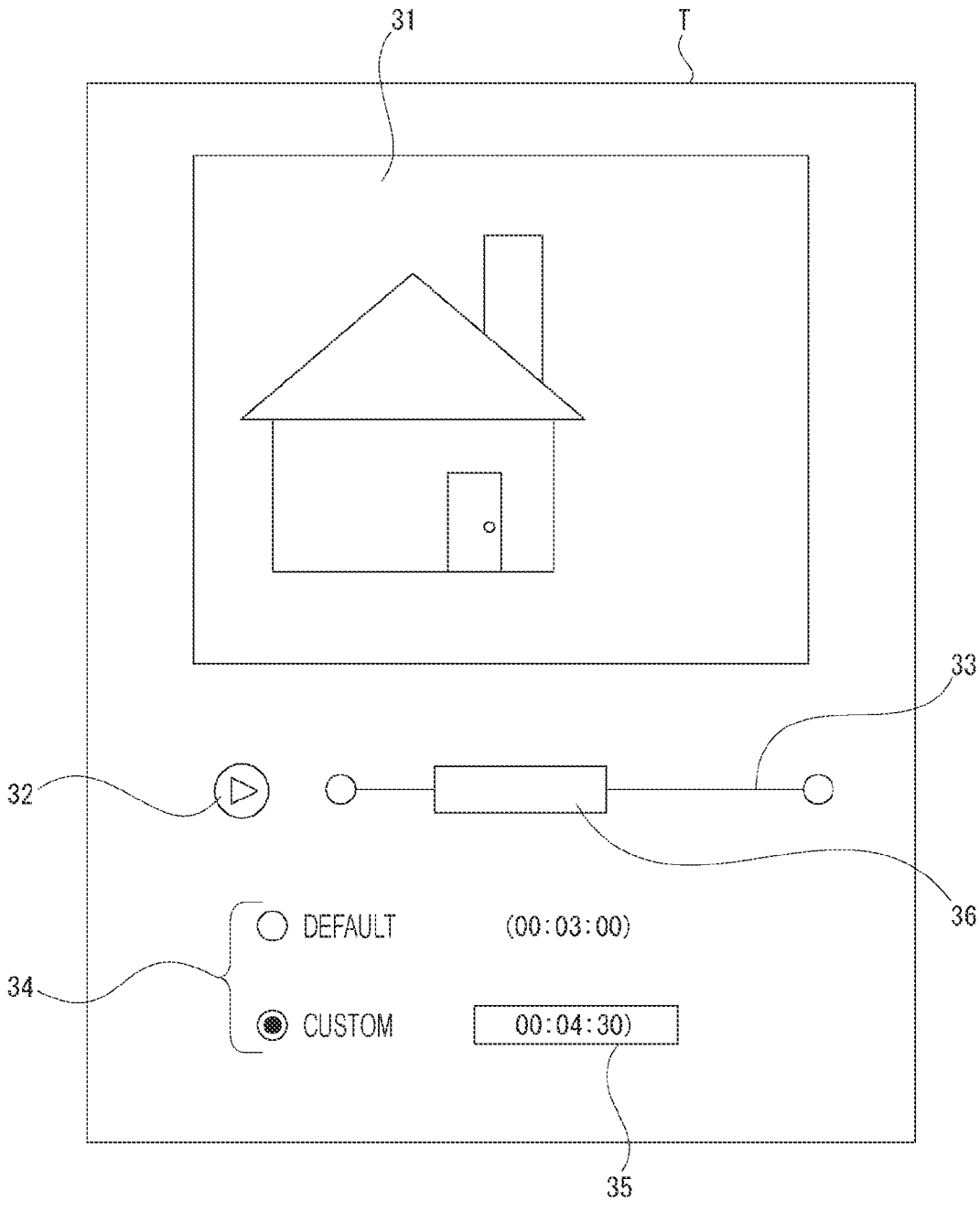
FIG. 19 is a diagram for explaining a user interface of a tool for designating reproduction time lengths of a material moving image and a moving image template.

The state illustrated in FIG. 19 is a state in which a portion excluding a beginning portion and a latter half portion of the material moving image is designated as the reproduction range by the knob 36.

The radio button 34 is an operator for designating a reproduction time length of the scene Sc of the moving image template. In a case where "default" is selected by the radio button 34, a reproduction time length determined in advance for the scene Sc, for example, 3 minutes, is selected. In this case, the shape of the knob 36 is changed so that the right end of the knob 36 is located at a reproduction position that is 3 minutes after the left end of the knob 36 on the seek bar 33.

Furthermore, in a case where the default is selected, the reproduction time length of the material moving image and the reproduction time length of the scene Sc match each other, and therefore the above processing of adjusting a reproduction time length does not occur.

In a case where "custom" is selected by the radio button 34, it is possible to designate the length of the reproduction range of the material moving image.

There are two methods of designating the length, and one of the methods can designate a position and a length of the reproduction range with respect to the reproduction time length of the material moving image by changing the length of the knob 36.

The other designation method can designate the position and length of the reproduction range by inputting a time in the input field 35. When the custom is selected by the radio button 34 and a time is input in the input field 35, the position of the right end of the knob 36 is determined so that the length of the reproduction range becomes the time input in the input field 35 on the basis of the left end of the knob 36 on the seek bar 33. In FIG. 19, the length of the knob 36 is set to a length corresponding to 4 minutes and 30 seconds.

Note that any time can be input in the input field 35, and in a case where the length of the knob 36 is changed by a drag operation or the like, a length of the reproduction range corresponding to the length of the knob 36 in the time direction is displayed.

As a result, both a method of instinctively determining the reproduction range and a method of logically determining the reproduction range are prepared, so that user convenience can be improved.

Note that as another example of a method of operating the knob 36, the left end of the knob 36 may be an operation region for moving only the position of the knob 36 without changing the shape of the knob 36, and the right end of the knob 36 may be an operation region for changing only the shape of the knob 36 without moving the position of the knob 36.

This method is suitable, for example, in a case where it is desired to change only the position of the reproduction range after determining the length of the reproduction range.

8. Processing Flow

Figure 20:
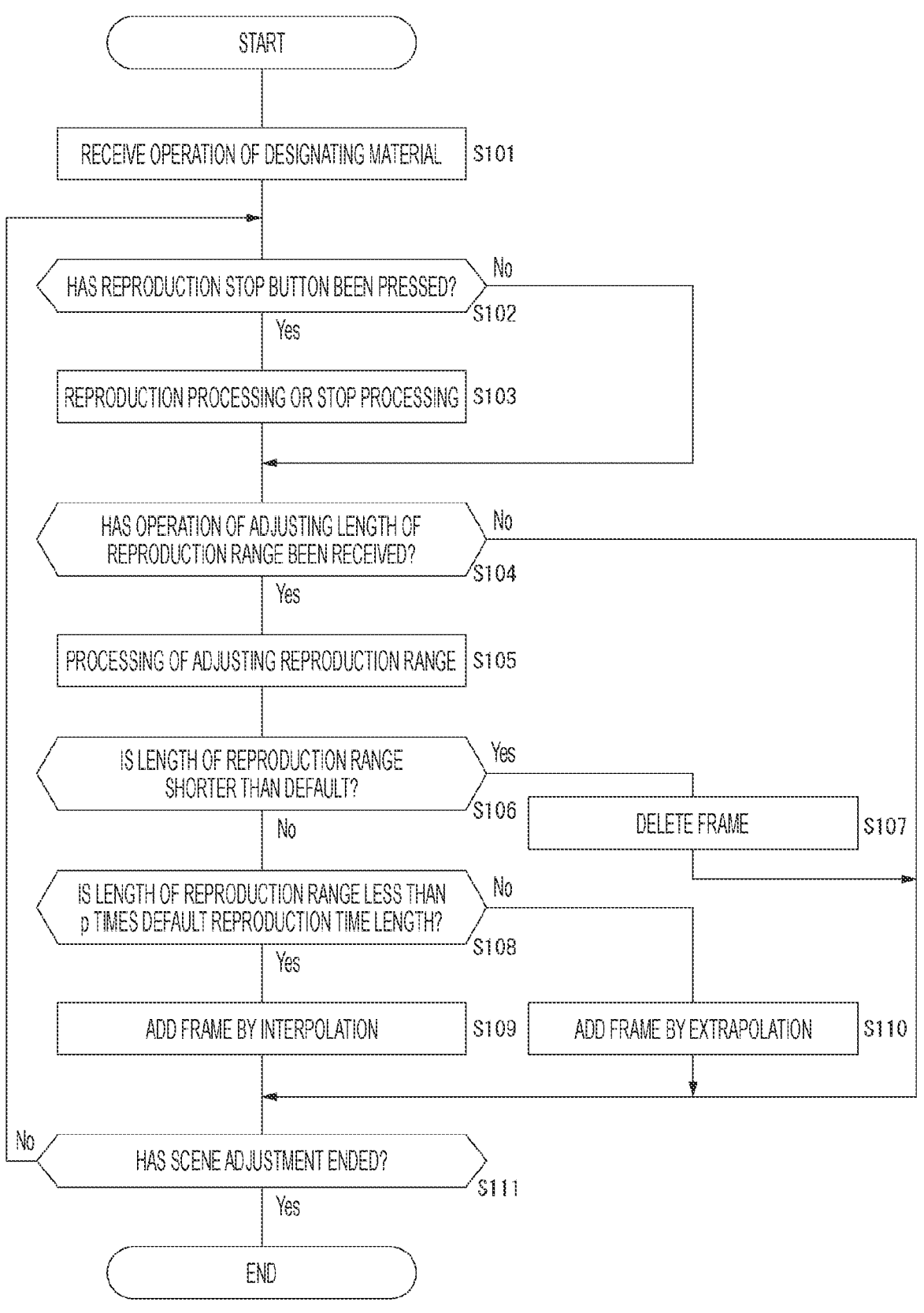
FIG. 20 is a flowchart illustrating an example of processing executed by a control unit of the information processing apparatus.

An example of processing executed by the control unit 2 of the information processing apparatus 1 will be described with reference to FIG. 20.

In step S101, the control unit 2 receives an operation of designating a material moving image. Note that, in this processing, designation of various materials to be fitted into the material frame MaF, such as text or a still image, may be received in addition to the material moving image.

In step S102, the control unit 2 determines whether or not the reproduction stop button 32 has been pressed. In a case where it is determined that the reproduction stop button 32 has been pressed, the control unit 2 performs reproduction processing or stop processing in step S103. Specifically, in a case where the material moving image is not being reproduced, processing of reproducing the material moving image is performed, and in a case where the material moving image is being reproduced, processing of stopping the reproduction is performed.

After the processing in step S103 or in a case where it is determined in step S102 that the reproduction stop button 32 has not been pressed, the control unit 2 determines in step S104 whether or not an operation of adjusting a length of a reproduction range has been received.

The adjustment operation is an operation for changing the time length of the reproduction range, and corresponds to the operation of changing the shape of the knob 36, the operation of selecting the radio button 34, the operation of inputting a time to the input field 35, or the like.

In a case where it is determined that the adjustment operation has been received, the control unit 2 performs reproduction range adjustment processing in step S105. In this processing, processing such as changing the position and shape of the knob 36 on the user interface is performed.

In step S106, the control unit 2 determines whether or not the length of the reproduction range is shorter than a default reproduction time length.

In a case where it is determined that the length of the reproduction range is shorter than the default reproduction time length, the control unit 2 deletes a frame of a moving image template in step S107. The deletion method may be any of the methods described above. Furthermore, the above methods may be combined.

In a case where it is determined that the length of the reproduction range is not shorter than the default reproduction time length, that is, in a case where it is determined that the length of the reproduction range is longer than the default reproduction time length, the control unit 2 determines in step S108 whether or not the length of the reproduction range is less than p times the default reproduction time length. The length of the reproduction range is a temporal length determined by the knob 36 or the time input to the input field 35. Furthermore, the default reproduction time length is the reproduction time length of the scene Sc before deletion or addition of a frame.

In a case where the length of the reproduction range is one time or more the default reproduction time length, if interpolation is performed, an effect of an animation is weakened. However, in a case where the length of the reproduction range is one time or more but less than p times the default reproduction time length, a sufficiently effective animation can be expressed.

Therefore, in a case where the length of the reproduction range is less than p times the default reproduction time length, the control unit 2 adds a frame by interpolation in step S109.

On the other hand, in a case where the length of the reproduction range is p times or more the default reproduction time length, the control unit 2 adds a frame by extrapolation in step S110.

In this way, appropriate frame addition can be performed while maintaining the animation effect to some extent.

In step S111, the control unit 2 determines whether or not the adjustment of the scene Sc has ended. This processing is, for example, processing of determining whether or not a user's operation for ending the adjustment of the scene Sc has been detected.

In a case where it is determined that the adjustment of the scene Sc has not ended, the control unit 2 returns to the processing in step S102. As a result, corresponding processing is executed as appropriate in response to a user's operation of pressing the reproduction stop button 32, operation on the knob 36, or the like.

On the other hand, in a case where it is determined that the adjustment of the scene Sc has ended, the control unit 2 ends the series of processing. Furthermore, in response to a user's operation of selecting a new scene Sc and starting adjustment of the scene Sc, the control unit 2 executes the series of processing illustrated in FIG. 20 again.

Note that although an example has been described in which, in a case where it is determined in step S104 that an operation of adjusting the length of the reproduction range has been received, the processing in and after step S105 is executed, the processing in and after step S105 may be automatically executed without performing the operation of adjusting the length of the reproduction range.

For example, in an initial stage where a material moving image having a time length different from the default reproduction time length, adjustment of the reproduction time length of the scene Sc to the reproduction time length of the material moving image, that is, the processing in steps S106 to S110 may be executed.

9. Computer Apparatus

A configuration of a computer apparatus including an arithmetic processing unit which realizes the above-described information processing apparatus 1 will be described with reference to FIG. 21.

A CPU 71 of the computer apparatus functions as the arithmetic processing unit which performs the above-described various type of processing, and executes the various type of processing in accordance with a program stored in a nonvolatile memory unit 74 such as a ROM 72 or, for example, an electrically erasable programmable read-only memory (EEP-ROM), or a program loaded from a storage unit 79 to a RAM 73. In addition, the RAM 73 also appropriately stores data and the like necessary for the CPU 71 to execute the various types of processing.

The CPU 71, the ROM 72, the RAM 73, and the non-volatile memory unit 74 are connected to one another via a bus 83. An input/output interface (I/F) 75 is also connected to the bus 83.

An input unit 76 including an operation element and an operation device is connected to the input/output interface 75.

For example, as the input unit 76, various types of operation elements and operation devices such as a keyboard, a mouse, a key, a dial, a touch panel, a touch pad, a remote controller, and the like are assumed.

A user operation is detected by the input unit 76, and a signal corresponding to the input operation is interpreted by the CPU 71.

In addition, a display unit 77 including an LCD, an organic EL panel, or the like, and a voice output unit 78 including a speaker or the like are connected to the input/output interface 75 integrally or separately.

The display unit 77 is a display unit that performs various displays, and includes, for example, a display device provided in a housing of a computer apparatus, a separate display device connected to the computer apparatus, or the like.

The display unit 77 executes display of an image for various types of image processing, a moving image to be processed, and the like on a display screen on the basis of an instruction from the CPU 71. In addition, the display unit 77 displays various types of operation menus, icons, messages, and the like, that is, displays as a graphical user interface (GUI) on the basis of an instruction from the CPU 71.

In some cases, the storage unit 79 including a hard disk, a solid-state memory, or the like, and a communication unit 80 including a modem or the like are connected to the input/output interface 75.

The communication unit 80 performs communication processing via a transmission path such as the Internet, wired/wireless communication with various types of devices, bus communication, and the like.

A drive 81 is also connected to the input/output interface 75 as necessary, and a removable storage medium 82 such as a magnetic disk, an optical disk, a magneto-optical disk, or a semiconductor memory is appropriately mounted.

A data file such as a program used for each processing can be read from the removable storage medium 82 by the drive 81. The read data file is stored in the storage unit 79, and images and voice included in the data file are output by the display unit 77 and the voice output unit 78. Furthermore, a computer program and the like read from the removable storage medium 82 are installed in the storage unit 79 as necessary.

In this computer apparatus, for example, software for processing of the present embodiment can be installed via network communication by the communication unit 80 or the removable storage medium 82. Alternatively, the software may be stored in advance in the ROM 72, the storage unit 79, or the like.

The CPU 71 executes information processing and communication processing necessary for the information processing apparatus 1 including the above-described arithmetic processing unit by executing the processing operations on the basis of the various programs.

Figure 21:
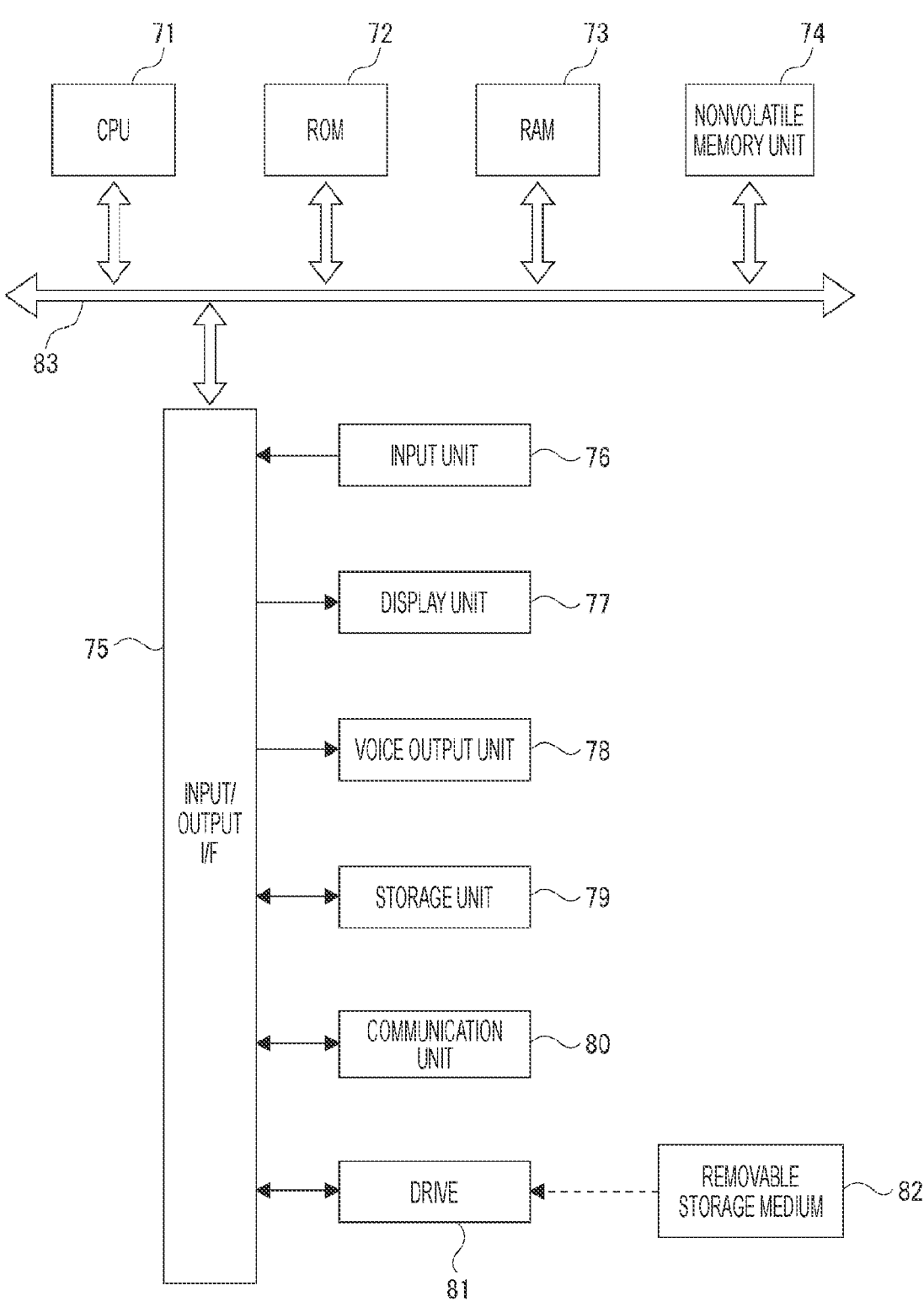
FIG. 21 is a block diagram of a computer apparatus.

Note that the information processing apparatus 1 is not limited to a single computer apparatus as illustrated in FIG. 21 and may be configured by systematizing a plurality of computer apparatuses. The plurality of computer apparatuses may be systematized by a local area network (LAN) or the like, or may be disposed in a remote place by a virtual private network (VPN) or the like using the Internet or the like. The plurality of computer apparatuses may include a computer apparatus as a server group (cloud) that can be used by a cloud computing service.

10. Conclusion

As described in the examples described above, the information processing apparatus 1 includes the information acquisition unit 23 that acquires information regarding a length of a moving image template and information regarding a length of a material moving image to be fitted into the moving image template, and the change processing unit 24 that changes reproduction management information regarding the moving image template in order to adjust the length of the moving image template in accordance with the length of the material moving image.

With this configuration, a reproduction time length of the moving image template is automatically adjusted in accordance with the length of the material moving image.

Therefore, a user can easily acquire a moving image of any length by using the material moving image. Furthermore, since material moving images having various reproduction time lengths can be selected without being bound by a specific reproduction time length set in advance for the moving image template, a material moving image desired to be used by the user and a moving image template desired to be used can be freely combined. Furthermore, a moving image intended by the user can be generated and provided.

As described with reference to FIGS. 1, 4 to 12, and other drawings, the moving image template may include at least one scene Sc, and the change processing unit 24 may change the reproduction management information regarding the scene Sc in a case where a length of the scene Sc into which the material moving image is to be fitted is different from the length of the material moving image.

With this configuration, in a case where a material moving image to be fitted is selected for each scene Sc, a reproduction time length can be adjusted for each scene Sc.

In particular, the user can change balance of the reproduction time length among the scenes Sc in any ways. For example, in a case where there is a scene Sc to be emphasized in a moving image to be created, it is possible to change the balance of the reproduction time length among the scenes Sc set in the moving image template. Furthermore, this change is easy because it is only necessary to select a moving image having a long reproduction time length as a material moving image to be fitted into the specific scene Sc.

As described with reference to FIG. 1 and other drawings, the reproduction management information may include a frame number (frame ID) of a frame included in the moving image template, and the change processing unit 24 of the information processing apparatus 1 may change the frame number.

By changing the reproduction management information, the reproduction time length of the moving image template can be adjusted.

As described with reference to FIG. 1 and other drawings, in a case where the length of the material moving image is shorter than the length of the scene Sc into which the material moving image is to be fitted, the change processing unit 24 of the information processing apparatus 1 may change the reproduction management information such that initial frames included in the scene Sc are thinned out.

This makes it unnecessary to perform processing such as re-creation of the initial frames in the adjustment for shortening the reproduction time length.

Therefore, it is possible to suppress an increase in processing load of the information processing apparatus 1.

As described with reference to FIG. 1 and other drawings, in a case where the length of the material moving image is longer than the length of the scene Sc into which the material moving image is to be fitted, the change processing unit 24 of the information processing apparatus 1 may change the reproduction management information such that an additional frame is inserted between initial frames included in the scene Sc.

This makes it unnecessary to perform processing such as re-creation of the initial frames in the adjustment for increasing the reproduction time length.

Therefore, it is possible to suppress an increase in processing load of the information processing apparatus 1.

As described with reference to FIGS. 7 to 9 and other drawings, the change processing unit 24 of the information processing apparatus 1 may insert the additional frame in the form of interpolation that does not change a change amount of an image in the scene Sc before and after the insertion of the additional frame.

With this configuration, for example, in a case where it is desired to make an animation of moving a certain material from a predetermined position (movement start coordinates) to a target position (movement end coordinates), a purpose of moving the material to the target position can be achieved even if the reproduction time length is adjusted.

Therefore, the user does not need to adjust the reproduction time length in consideration of the target position of the material, and can easily achieve the purpose.

As described with reference to FIGS. 7, 9, and other drawings, the reproduction management information may include numerical information (a frame ID, coordinate information, transparency, or an enlargement ratio) regarding a change in an image, and the change processing unit of the information processing apparatus 1 may generate reproduction management information regarding the additional frame on the basis of the reproduction management information regarding initial frames positioned before and after an insertion position of the additional frame. Furthermore, for example, linear interpolation may be used to generate the reproduction management information regarding the additional frame.

This makes it possible for the user to adjust the reproduction time length according to the material moving image without thinking about various numerical information set in the moving image template.

Therefore, user convenience can be improved.

As described with reference to FIGS. 10 to 12 and other drawings, the change processing unit 24 of the information processing apparatus 1 may insert the additional frame in the form of extrapolation that does not change a change amount of an image between the initial frames of the moving image template in the scene Sc before and after the insertion of the additional frame.

With this configuration, for example, in a case where it is desired to obtain an animation moving image in which a certain material is moved at a predetermined moving speed, the reproduction time length can be adjusted without changing the moving speed of the material.

Furthermore, to obtain such moving image data, the user is only required to designate a reproduction time length as the adjustment of the reproduction time length, which is easy.

Therefore, user convenience can be improved.

As described with reference to FIG. 10 and other drawings, the change processing unit 24 of the information processing apparatus 1 may make a change such that a change amount of an image between additional frames is the same as the change amount of the image between the initial frames.

This makes it possible to generate moving image data in which an amination is consistent from the beginning to the end of the scene Sc.

As described with reference to FIG. 10 and other drawings, the change amount of the image may be a change amount of coordinates of an object (material) included in an initial frame.

The object as used herein is a text, a still image, a moving image, or the like as the material described above. It is possible to generate moving image data including an animation in which such a material moves at a constant speed.

As described above, the change amount of the image may be a change amount of a size of the object included in the initial frame. Specifically, the change amount of the image may be an enlargement ratio (or reduction ratio) or the like. This makes it possible to express an animation of zooming in on a predetermined position or an animation of zooming out. Then, since these material moving images can be selected without depending on the reproduction time length of the moving image template, the animation can be realized by using a material moving image desired by the user.

As described with reference to FIG. 20 and other drawings, in a case where the length of the material moving image is longer than the length of the scene Sc into which the material moving image is to be fitted and a difference in length is equal to or less than a predetermined time, the change processing unit 24 of the information processing apparatus 1 may change the reproduction management information such that as the insertion of the additional frame, interpolation is performed in which a change amount of an image from a frame in which the change of the image is started to a frame in which the change is ended in the scene Sc is not changed before and after the insertion, and in a case where the difference is larger than the predetermined time, the change processing unit of the information processing apparatus 1 may change the reproduction management information such that as the insertion of the additional frame, extrapolation is performed in which a change amount of an image between initial frames of the moving image template is not changed before and after the insertion of the additional frame in the scene Sc.

This makes it possible to prevent coordinates (movement end coordinates) of a destination to which the material is to be moved from being excessively different between the moving image template and actually created moving image data while suppressing a decrease in animation effect.

As described in the description of the transition layer, one scene Sc in the moving image template may include a plurality of frames, one frame may be one in which the material moving image and a transition moving image are synthesized, and the transition moving image may be used to express transition between scenes Sc and may be arranged at least at a joint between the scenes Sc.

The joint between the scenes Sc indicates at least one of end of a certain scene Sc or beginning of a next scene Sc. For example, the transition moving image may be arranged from end of a certain scene Sc to beginning of a next scene Sc, may be arranged only at the end of the certain scene Sc, or may be arranged only at the beginning of the scene Sc next to the certain scene Sc.

By arranging the transition moving image at the joint between the scenes Sc, it is possible to make the transition between the scenes appear natural.

As described in the description of the transition layer, the change processing unit 24 of the information processing apparatus 1 may change a frame number (frame ID) of the scene Sc in the moving image template in accordance with the length of the material moving image, and may change a frame number of the transition moving image in accordance with the change of the frame number of the scene Sc.

With this configuration, even in a case where a frame ID of a frame at end of a certain scene Sc of the moving image template is changed by adjusting the reproduction time length, a frame ID of a corresponding frame of the transition moving image is changed.

Therefore, the transition moving image can be arranged at the joint between the scenes Sc with certainty regardless of whether or not the reproduction time length of the moving image template is adjusted.

As described with reference to FIG. 16 and other drawings, in a case where the length of the material moving image is shorter than the length of the scene Sc into which the material moving image is to be fitted, the change processing unit 24 of the information processing apparatus 1 may change the reproduction management information such that initial frames and frames of the transition moving image included in the scene Sc are thinned out.

In the thinning-out of the transition moving image, such a situation where consecutive frames are deleted is prevented as much as possible.

This can avoid such frame deletion that an animation expressing transition between the scenes Sc is interrupted.

Therefore, it is possible to realize an appropriate animation of transition between the scenes Sc according to intention of a creator of the moving image template.

As described with reference to FIGS. 14, 17, and other drawings, the transition moving image may include the visible frame VFr expressing transition between the scenes Sc and the invisible frame NVFr in which an image is visually unrecognizable, and the change processing unit 24 may change the reproduction management information such that a duplicate frame obtained by duplicating the invisible frame NVFr is inserted between the invisible frames NVFr.

This prevents a visible portion of the transition moving image from being elongated. Therefore, it is possible to express transition between the scenes Sc by an animation according to intention of a creator of the moving image template.

As described with reference to FIG. 17 and other drawings, the transition moving image may include the visible frame VFr expressing transition between the scenes Sc and the invisible frame NVFr in which an image is visually unrecognizable, and the change processing unit 24 of the information processing apparatus 1 may change the reproduction management information such that the visible frame VFr is arranged to avoid a center of the scene Sc.

This makes it possible to specify that a frame arranged at the center of the scene Sc is an invisible frame without determining whether the frame of the transition moving image is the visible frame VFr or the invisible frame NVFr.

For example, in a case where the reproduction time length of the transition moving image is further extended in response to a user's operation, the invisible frame NVFr can be inevitably duplicated and inserted by selecting the frame arranged at the center of the scene Sc, duplicating the selected frame, and inserting the duplicate frame. Therefore, the processing load of the information processing apparatus 1 can be reduced.

An information processing method according to the present embodiment includes causing a computer apparatus to perform processing of acquiring information regarding a length of a moving image template and information regarding a length of a material moving image to be fitted into the moving image template, and processing of changing reproduction management information regarding the moving image template in order to adjust the length of the moving image template in accordance with the length of the material moving image.

The program to be executed by the information processing apparatus 1 described above can be recorded in advance in a hard disk drive (HDD) as a storage medium built in an apparatus such as a computer apparatus, a ROM in a microcomputer having a CPU, or the like. Alternatively, the program can be temporarily or permanently stored (recorded) in a removable storage medium such as a flexible disk, a compact disc read only memory (CD-ROM), a magneto optical (MO) disk, a digital versatile disc (DVD), a Blu-ray Disc (registered trademark), a magnetic disk, a semiconductor memory, or a memory card. Such a removable storage medium can be provided as what is called package software.

Furthermore, such a program can be installed from the removable storage medium into a personal computer or the like, or can be downloaded from a download site via a network such as a local area network (LAN) or the Internet.

Note that the effects described in the present specification are merely examples and are not limited, and other effects may be provided.

Furthermore, each example described above may be combined in any way, and the above-described various functions and effects may be obtained even in a case where various combinations are used.

11. Present Technology

The present technology can also adopt the following configurations.

(1)

An information processing apparatus including:

an information acquisition unit that acquires information regarding a length of a moving image template and information regarding a length of a material moving image to be fitted into the moving image template; and a change processing unit that changes reproduction management information regarding the moving image template in order to adjust the length of the moving image template in accordance with the length of the material moving image.

(2)

The information processing apparatus according to (1), in which the moving image template includes at least one scene, and the change processing unit changes the reproduction management information regarding the scene in a case where a length of the scene into which the material moving image is to be fitted is different from the length of the material moving image.

(3)

The information processing apparatus according to (1) or (2), in which the reproduction management information includes a frame number of a frame included in the moving image template, and the change processing unit changes the frame number.

(4)

The information processing apparatus according to (2), in which in a case where the length of the material moving image is shorter than the length of the scene into which the material moving image is to be fitted, the change processing unit changes the reproduction management information such that initial frames included in the scene are thinned out.

(5)

The information processing apparatus according to (2), in which in a case where the length of the material moving image is longer than the length of the scene into which the material moving image is to be fitted, the change processing unit changes the reproduction management information such that an additional frame is inserted into initial frames included in the scene.

(6)

The information processing apparatus according to (5), in which the change processing unit inserts the additional frame in a form of interpolation that does not change a change amount of an image in the scene before and after the insertion of the additional frame.

(7)

The information processing apparatus according to (6), in which the reproduction management information includes numerical information regarding a change in an image, and the change processing unit generates the reproduction management information regarding the additional frame on the basis of the reproduction management information regarding the initial frames positioned before and after an insertion position of the additional frame.

(8)

The information processing apparatus according to any one of (5) to (7), in which the change processing unit inserts the additional frame in a form of extrapolation that does not change a change amount of an image between initial frames of the moving image template in the scene before and after the insertion of the additional frame.

(9)

The information processing apparatus according to (8), in which the change processing unit makes the change such that a change amount of an image between the additional frames is same as the change amount of the image between the initial frames.

(10)

The information processing apparatus according to (9), in which the change amount of the image is a change amount of coordinates of an object included in the initial frames.

(11)

The information processing apparatus according to (9), in which the change amount of the image is a change amount of a size of an object included in the initial frames.

(12)

The information processing apparatus according to any one of (5) to (11), in which in a case where the length of the material moving image is longer than the length of the scene into which the material moving image is to be fitted and a difference in length is equal to or less than a predetermined time, the change processing unit changes the reproduction management information such that as the insertion of the additional frame, interpolation is performed in which a change amount of an image from a frame in which the change of the image is started to a frame in which the change is ended in the scene is not changed before and after the insertion, and in a case where the difference is larger than the predetermined time, the change processing unit changes the reproduction management information such that as the insertion of the additional frame, extrapolation is performed in which a change amount of an image between initial frames of the moving image template is not changed before and after the insertion of the additional frame in the scene.

27

(13)

The information processing apparatus according to (2), in which one scene includes a plurality of frames, one frame is one in which the material moving image and a transition moving image are synthesized, and the transition moving image is used to express transition between scenes and is arranged at least at a joint between the scenes.

(14)

The information processing apparatus according to (13), in which the change processing unit changes a frame number of the scene in the moving image template in accordance with the length of the material moving image, and changes a frame number of the transition moving image in accordance with the change of the frame number of the scene.

(15)

The information processing apparatus according to (14), in which in a case where the length of the material moving image is shorter than the length of the scene into which the material moving image is to be fitted, the change processing unit changes the reproduction management information such that initial frames and frames of the transition moving image included in the scene are thinned out.

(16)

The information processing apparatus according to (14) or (15), in which the transition moving image includes a visible frame expressing transition between the scenes and an invisible frame in which an image is visually unrecognizable, and the change processing unit changes the reproduction management information such that a duplicate frame obtained by duplicating the invisible frame is inserted between the invisible frames.

(17)

The information processing apparatus according to any one of (13) to (16), in which the transition moving image includes a visible frame expressing transition between the scenes and an invisible frame in which an image is visually unrecognizable, and the change processing unit changes the reproduction management information such that the visible frame is arranged to avoid a center of the scene.

(18)

An information processing method including causing a computer apparatus to perform:

processing of acquiring information regarding a length of a moving image template and information regarding a length of a material moving image to be fitted into the moving image template; and processing of changing reproduction management information regarding the moving image template in order to adjust the length of the moving image template in accordance with the length of the material moving image.

(19)

A program causing an arithmetic processing apparatus to execute:

a function of acquiring information regarding a length of a moving image template and information regarding a length of a material moving image to be fitted into the moving image template; and

a function of changing reproduction management information regarding the moving image template in order to adjust the length of the moving image template in accordance with the length of the material moving image.

REFERENCE SIGNS LIST

1 Information processing apparatus
23 Information acquisition unit
24 Change processing unit
Sc, Sc1, Sc2, Sc3 Scene
VFr Visible frame
NVFr Invisible frame

The invention claimed is:

1. An information processing apparatus, comprising:
a central processing unit (CPU) configured to:
acquire first information and second information, wherein
the first information is associated with regarding a length of a moving image template,
the second information is associated with a length of a material moving image, and
the material moving image is fittable into the moving image template; and
change first reproduction management information to adjust the length of the moving image template, wherein
the first reproduction management information is changed based on the length of the material moving image, and
the first reproduction management information is associated with the moving image template.

2. The information processing apparatus according to claim 1, wherein
the moving image template includes at least one scene,
the CPU is further configured to change second reproduction management information based on the length of the material moving image and a length of a scene of the at least one scene,
the length of the scene is different from the length of the material moving image,
the material moving image is fittable into the scene, and
the second reproduction management information is associated with the scene.

3. The information processing apparatus according to claim 1, wherein
the first reproduction management information includes a frame number of a frame,
the frame is in the moving image template, and
the CPU is further configured to change the frame number.

4. The information processing apparatus according to claim 2, wherein
the CPU is further configured to:
thin out a plurality of initial frames based on the length of the material moving image and the length of the scene, wherein
the length of the material moving image is less than the length of the scene, and
the plurality of initial frames is in the scene; and
change the second reproduction management information based on the thinning out of the plurality of initial frames.

5. The information processing apparatus according to claim 2, wherein
the CPU is further configured to:
insert an additional frame into a plurality of initial frames based on the length of the material moving image and the length of the scene, wherein
the length of the material moving image is greater than the length of the scene, and
the plurality of initial frames is in the scene; and
change the second reproduction management information based on the insertion of the additional frame.

6. The information processing apparatus according to claim 5, wherein
the CPU is further configured to insert the additional frame via interpolation to maintain a first change amount of a first image in the scene before the insertion of the additional frame and after the insertion of the additional frame.

7. The information processing apparatus according to claim 6, wherein
the second reproduction management information includes numerical information,
the numerical information is associated with a change in the first image,
the CPU is further configured to generate third reproduction management information based on fourth reproduction management information,
the third reproduction management information is associated with the additional frame,
the fourth reproduction management information is associated with the plurality of initial frames,
the plurality of initial frames is at a first position in the scene and at a second position in the scene,
the first position is prior to an insertion position of the additional frame in the scene, and
the second position is subsequent to the insertion position of the additional frame.

8. The information processing apparatus according to claim 5, wherein the CPU is further configured to insert the additional frame via extrapolation to maintain a second change amount of a first image between the plurality of initial frames before the insertion of the additional frame and after the insertion of the additional frame.

9. The information processing apparatus according to claim 8, wherein the CPU is further configured to maintain a third change amount of the first image between the additional frames same as the second change amount of the first image between the plurality of initial frames.

10. The information processing apparatus according to claim 9, wherein
the second change amount of the first image is a change amount of coordinates of an object, and
the object is in the plurality of initial frames.

11. The information processing apparatus according to claim 9, wherein
the second change amount of the first image is a change amount of a size of an object, and
the object is in the plurality of initial frames.

12. The information processing apparatus according to claim 5, wherein the CPU is further configured to:
insert the additional frame, via interpolation, to maintain a fourth change amount of a first image from a first frame in the scene to a second frame in the scene before the insertion of the additional frame and after the insertion of the additional frame, wherein
the first frame corresponds to a start of a change of the first image, the second frame corresponds to an end of the change of the first image,
the additional frame via the interpolation is inserted based a difference between the length of the material moving image and the length of the scene, and
the difference is less than or equal to a specific length; and
insert the additional frame, via extrapolation, to maintain a fifth change amount of the first image between the plurality of initial frames before the insertion of the additional frame in the scene and after the insertion of the additional frame in the scene, wherein
the additional frame via the extrapolation is inserted based on the difference between the length of the material moving image and the length of the scene, and
the difference is greater than the specific length.

13. The information processing apparatus according to claim 2, wherein
one of the at least one scene includes a plurality of frames,
a frame of the plurality of frames includes the material moving image in synthesis with a transition moving image, and
the transition moving image indicates transition between adjacent scenes of a plurality of scenes of the moving image template,
the plurality of scenes includes the at least one scene, and
the transition moving image is at least at a joint between the adjacent scenes.

14. The information processing apparatus according to claim 13, wherein the CPU is further configured to:
change a first frame number of the scene in the moving image template based the length of the material moving image; and
change a second frame number of the transition moving image based on the change of the first frame number.

15. The information processing apparatus according to claim 14, wherein
the CPU is further configured to thin out a plurality of initial frames and the plurality of frames of the transition moving image, based on the length of the material moving image and the length of the scene,
the length of the material moving image is less than the length of the scene, and
each of the plurality of initial frames and the plurality of frames is in the scene.

16. The information processing apparatus according to claim 14, wherein
the transition moving image includes a plurality of visible frames and a plurality of invisible frames,
the plurality of visible frames indicates the transition between the adjacent scenes,
each of the plurality of invisible frames corresponds to a frame in which a first image is visually unrecognizable, and
the CPU is further configured to:
duplicate the plurality of invisible frames to obtain a plurality of duplicate frames:
insert the obtained plurality of duplicate frames into the plurality of invisible frames; and
change the second reproduction management information based on the insertion of the obtained plurality of duplicate frames.

17. The information processing apparatus according to claim 13, wherein
the transition moving image includes a visible frame and an invisible frame, the visible frame indicates the transition between the adjacent scenes, the invisible frame corresponds to a frame in which a first image is visually unrecognizable, and the CPU is further configured to:

arrange the visible frame in the scene except at a centre of the scene; and change the second reproduction management information based on the arrangement of the visible frame.

18. An information processing method, comprising:

acquiring first information and second information, wherein the first information is associated with a length of a moving image template, the second information is associated with a length of a material moving image, and the material moving image is fittable into the moving image template; and changing reproduction management information to adjust the length of the moving image template, wherein the reproduction management information is changed based on the length of the material moving image, and the reproduction management information is associated with the moving image template.

19. A non-transitory computer-readable medium having stored thereon computer-executable instructions, that when executed by an arithmetic processing apparatus, causes the arithmetic processing apparatus to execute operations, the operations comprising:

acquiring first information and second information, wherein the first information is associated with a length of a moving image template, the second information is associated with a length of a material moving image, and the material moving image is fittable into the moving image template; and changing reproduction management information to adjust the length of the moving image template, wherein the reproduction management information is changed based on the length of the material moving image, and the reproduction management information is associated with the moving image template.

\* \* \* \* \*